United States Patent
Brown et al.

(10) Patent No.: US 7,486,255 B2
(45) Date of Patent: Feb. 3, 2009

(54) SCANNED BEAM SYSTEM AND METHOD USING A PLURALITY OF DISPLAY ZONES

(75) Inventors: Margaret K. Brown, Seattle, WA (US); Randall B. Sprague, Carnation, WA (US); Maciej Jakuc, Everett, WA (US)

(73) Assignee: Microvision, Inc., Redmond, WA (US)

( * ) Notice: Subject to any disclaimer, the term of this patent is extended or adjusted under 35 U.S.C. 154(b) by 920 days.

(21) Appl. No.: 11/003,128

(22) Filed: Dec. 3, 2004

(65) Prior Publication Data

US 2006/0017655 A1     Jan. 26, 2006

Related U.S. Application Data

(60) Provisional application No. 60/590,391, filed on Jul. 21, 2004.

(51) Int. Cl.
  *G09G 5/00* (2006.01)
(52) U.S. Cl. .............................. 345/7; 345/4
(58) Field of Classification Search ................. 345/1.1, 345/6, 7, 8, 55, 108, 1.2, 1.3, 3.2, 4, 5, 552, 345/565; 359/630; 347/250
See application file for complete search history.

(56) References Cited

U.S. PATENT DOCUMENTS

| | | | | |
|---|---|---|---|---|
| 4,902,083 A | 2/1990 | Wells | ............ | 350/6.6 |
| 4,934,773 A | 6/1990 | Becker | ............ | 350/6.6 |
| 5,003,300 A | 3/1991 | Wells | ............ | 340/705 |
| 5,023,905 A | 6/1991 | Wells et al. | ............ | 379/96 |
| 5,048,077 A | 9/1991 | Wells et al. | ............ | 379/96 |
| 5,334,991 A | 8/1994 | Wells et al. | ............ | 345/8 |
| 5,467,104 A | 11/1995 | Furness, III et al. | ............ | 345/8 |
| 5,525,810 A | 6/1996 | Jewell et al. | ............ | 250/566 |
| 5,657,165 A | 8/1997 | Karpman et al. | ............ | 359/634 |
| 5,742,421 A | 4/1998 | Wells et al. | ............ | 359/214 |
| 6,038,051 A | 3/2000 | Suzuki et al. | ............ | 359/204 |
| 6,046,720 A * | 4/2000 | Melville et al. | ............ | 345/108 |
| 6,140,979 A | 10/2000 | Gerhard et al. | ............ | 345/7 |
| 6,433,907 B1 | 8/2002 | Lippert et al. | ............ | 359/201 |
| 6,445,362 B1 | 9/2002 | Tegreene | | |
| 6,515,781 B2 | 2/2003 | Lewis et al. | ............ | 359/204 |
| 6,611,241 B1 * | 8/2003 | Firester et al. | ............ | 345/1.3 |
| 6,714,331 B2 | 3/2004 | Lewis et al. | ............ | 359/204 |

(Continued)

FOREIGN PATENT DOCUMENTS

EP     1381241 A2     1/2004

OTHER PUBLICATIONS

International Search Report, PCT/US2005/026107, Dec. 2, 2005.

*Primary Examiner*—Nitin Patel
(74) *Attorney, Agent, or Firm*—Kevin D. Wills

(57) ABSTRACT

A scan assembly includes an emitter array containing a plurality of optical emitters. Each optical emitter generates a corresponding image beam and the scan assembly scans the image beams in a plurality of overlapping display zones. The overlap of adjacent image display zones forms blending zones and the scan assembly can modulate the intensities of the image beams as a function of the position of the image beams in the blending zones. This modulation for a given blending zone may be a linearly increasing intensity of a first image beam and a linearly decreasing intensity of a second image beam.

35 Claims, 17 Drawing Sheets

U.S. PATENT DOCUMENTS

| | | |
|---|---|---|
| 7,230,767 B2 * | 6/2007 | Walck et al. ................. 359/630 |
| 2001/0024326 A1 | 9/2001 | Nakamura et al. .......... 359/618 |
| 2001/0050661 A1 * | 12/2001 | Noda et al. .................... 345/32 |
| 2002/0163701 A1 | 11/2002 | Plesko ........................ 359/199 |
| 2004/0004585 A1 | 1/2004 | Brown et al. .................. 345/32 |
| 2004/0227694 A1 * | 11/2004 | Sun et al. ........................ 345/6 |
| 2005/0056623 A1 * | 3/2005 | Jung ..................... 219/121.65 |
| 2005/0231808 A1 * | 10/2005 | Watson et al. ............... 359/618 |
| 2005/0275713 A1 * | 12/2005 | Kawai ........................ 347/250 |

* cited by examiner

SCANNED BEAM SYSTEM AND METHOD USING A PLURALITY OF DISPLAY ZONES

CROSS REFERENCE TO RELATED APPLICATIONS

This application claims the benefit of U.S. Provisional Patent Application No. 60/590,391 filed on Jul. 21, 2004, which is incorporated herein by reference.

BACKGROUND

An electronic image generator, such as television set, scans a viewable image, or a sequence of viewable video images, onto a display screen by electronically sweeping an electromagnetic image beam across the screen. For example, in a television set, the image beam is a beam of electrons, and a coil generates a magnetic field or electric field to sweep the beam. An optical image generator is similar except that it scans a viewable image by sweeping a beam of light across a field-of-view. In the case of a retinal display, the optical image generator scans a viewable image onto a viewer's retina(s). In the case of a projection display system, the optical image generator scans the beam of light onto a screen, which may in turn be viewed.

FIG. 1 is a diagram of a conventional optical image-display system 10, which includes an optical image generator 12 and a display screen 14. The image generator 12 includes a beam generator 16 for generating an optical beam 18, and includes a scan assembly 20 for scanning an image onto the screen 14 with the beam. Where the system 10 is a retinal display, the scan assembly 20 scans the image onto a viewer's retina(s) (not shown). The scan assembly 20 includes a reflector 22, which simultaneously rotates back and forth in the horizontal (X) and vertical (Y) dimensions about pivot arms 24a and 24b and pivot arms 26a and 26b, respectively. By rotating back and forth, the reflector 22 sweeps the beam 18 in a two-dimensional (X-Y) pattern to generate the image on the screen 14 (or retina(s)). The scan assembly 20 includes other components and circuitry (not shown) for rotating the reflector 22 and monitoring its instantaneous rotational position, which is proportional to the instantaneous location at which the beam 18 strikes the screen 14. In an alternative implementation that is not shown, the scan assembly 20 may include two reflectors, one for sweeping the beam 18 in the horizontal (X) dimension and the other for sweeping the beam in the vertical (Y) dimension. An optical image-display system that is similar to the system 10 is disclosed in U.S. Pat. No. 6,140,979 of Gerhard, et al., entitled SCANNED DISPLAY WITH PINCH, TIMING, AND DISTORTION CORRECTION and U.S. Pat. No. 5,467,104 of Furness, et al., entitled VIRTUAL RETINAL DISPLAY, each of which is incorporated by reference.

Referring to FIGS. 1-3, the operation of a raster-scanning optical image-display system 10 is discussed. In FIG. 1 the image generator 12 scans an image through an initial pixel location X=0, Y=0 and an end pixel location X=n, Y=m, where n is the number of pixels in the horizontal (X) dimension of the image and m is the number of pixels in the vertical (Y) dimension of the image. Specifically, the beam generator 16 modulates the intensity of the optical beam 18 to form a first pixel $P_{0,0}$ of the scanned image when the reflector 22 directs the beam onto the location X=0, Y=0. As the reflector 22 sweeps the beam 18 toward the location X=n, Y=m, the generator 16 periodically modulates the intensity of the beam to sequentially form the remaining pixels of the image including the last pixel $P_{n,m}$. Then, the image generator 12 flies back to scan the next video frame starting at the location X=0, Y=0, and repeats this procedure for all subsequent video frames.

Referring to FIG. 2, during the scanning of the image, the reflector 22 sinusoidally sweeps the beam 18 bi-directionally in the horizontal (X) direction at a horizontal sweep frequency $f_h=1/t_h$, where $t_h$ is the period of the horizontal sinusoid. FIG. 2 is a plot of this horizontal sinusoid, which indicates the position of the beam 18 in the horizontal (X) dimension versus time, where + corresponds to the right side of the screen 14 and – corresponds to the left side. As this plot shows, the reflector 22 oscillates in a sinusoidal manner about the pivot arms 24a and 24b at $f_h$, and thus sinusoidally sweeps the beam 18 from side to side of the screen 14 at the same frequency. The horizontal sweep is bi-directional because the beam 18 is "on", and thus generates pixels, in both the left-to-right (+X) and right-to-left (–X) horizontal directions. Although not required, $f_h$ may substantially equal to the resonant frequency of the reflector 22 about the arms 24a and 24b. One advantage of designing the reflector 22 such that it resonates at $f_h$ is that the scan assembly 20 can drive the reflector in the horizontal (X) dimension with relatively little power.

Referring to FIG. 3, the reflector 22 also, for a raster scanning system, linearly sweeps the beam 18 uni-directionally in the vertical (Y) dimension at a vertical sweep frequency $f_v=1/t_v$, where $t_v$ is the period of the vertical waveform. In the case of a raster scanning system, the slow scan waveform approximates a saw-tooth wave. FIG. 3 is a plot of this saw-tooth wave, which indicates the position of the beam 18 in the vertical (Y) dimension versus time, where + corresponds to the bottom of the screen 14 and – corresponds to the top. As this plot shows, during a vertical scan period V, the scan assembly 20 rotates the reflector 22 about the pivot arms 26a and 26b from a top position to a bottom position approximately linearly, thus causing the reflector to sweep the beam 18 from the top row of pixels (including pixel $P_{0,0}$) of the screen 14 to the bottom row of pixels (including pixel $P_{n,m}$) of the screen (–Y direction). During a fly-back period FB, the scan assembly 20 quickly (as compared to the scan period V) rotates the reflector 22 back to its top position (corresponding to $P_{0,0}$) to begin the scanning of a new video frame. Consequently, $t_v=V+FB$ such that the vertical sweep frequency $f_v=1/(V+FB)$. Moreover, the vertical sweep is uni-directional because the beam 18 is "on" only during the scan period V while the reflector 22 sweeps the beam from top ($P_{0,0}$) to bottom ($P_{n,m}$) (–Y direction), and is off during the flyback period FB when the reflector 22 returns to its top position ($P_{0,0}$).

The beam generator 16 modulates video information on the optical beam 18 and may be formed from a number of different types of light sources, such as a laser, laser diode, or light emitting diode (LED), for example. Multiple colored light sources such as red, green and blue lasers, laser diodes, or LEDs may be included in the beam generator 16 to provide colored light that is modulated with red, green, blue (RGB) information via the respective light sources. The video modulated beams from the respective light sources are combined through suitable optics and then scanned onto the screen 14 or onto the retina of a person's eye to generate a corresponding video image.

While the beam generator 16 can be formed from lasers, laser diodes, LEDs, or other suitable light sources, cost and operational characteristics may make one or more of type of light source more or less attractive depending upon the application of the image-display system 10. For example, lasers provide high intensity light for the optical beam 18, which will generate a bright image, but may be relatively expensive and require external modulation. Laser diodes can provide a high intensity optical beam 18 at a relatively low cost compared to other types of lasers. Although costing substantially less than other types of lasers, however, laser diodes are still relatively expensive.

In contrast to lasers and laser diodes, LEDs are relatively inexpensive and therefore from a cost perspective are ideally suited for applications where the overall cost of the image-display system 10 is a primary consideration. There are several different types of LEDs, with some LEDs being more specifically referred to as surface emitting LEDs (SELEDs), meaning that light is emitted perpendicular to an active region of the LED surface. The use of SELEDs, which may be referred to simply as LEDs in the present description, may be limited in the image-display system 10 for some applications due to the relatively low intensity of generated light, resulting in a low intensity optical beam 18 and an image that is not as bright as desired. For example, if the beam generator 16 were to be formed from a red, a blue, and a green SELED, the resulting image on the screen 14 may not be as bright as desired.

Many current image-display systems 10 utilize either lasers or laser diodes to generate sufficiently bright images. While lasers provide a required intensity of light, they may be relatively expensive, undesirably increasing the overall cost of the system 10.

Another type of LED known as an edge emitting LED (EELED) emits much higher intensity light from between the heterogeneous layers in the device and thus would be well-suited to use in the beam generator 16, but such EELEDs may adversely affect cost and availability of systems constructed with them.

SUMMARY

According to one aspect of the present invention, a scan assembly includes an emitter array containing a plurality of optical emitters. Each optical emitter generates a corresponding image beam and the scan assembly scans the image beams in a plurality of overlapping display zones.

DETAILED DESCRIPTION

Figure 1:
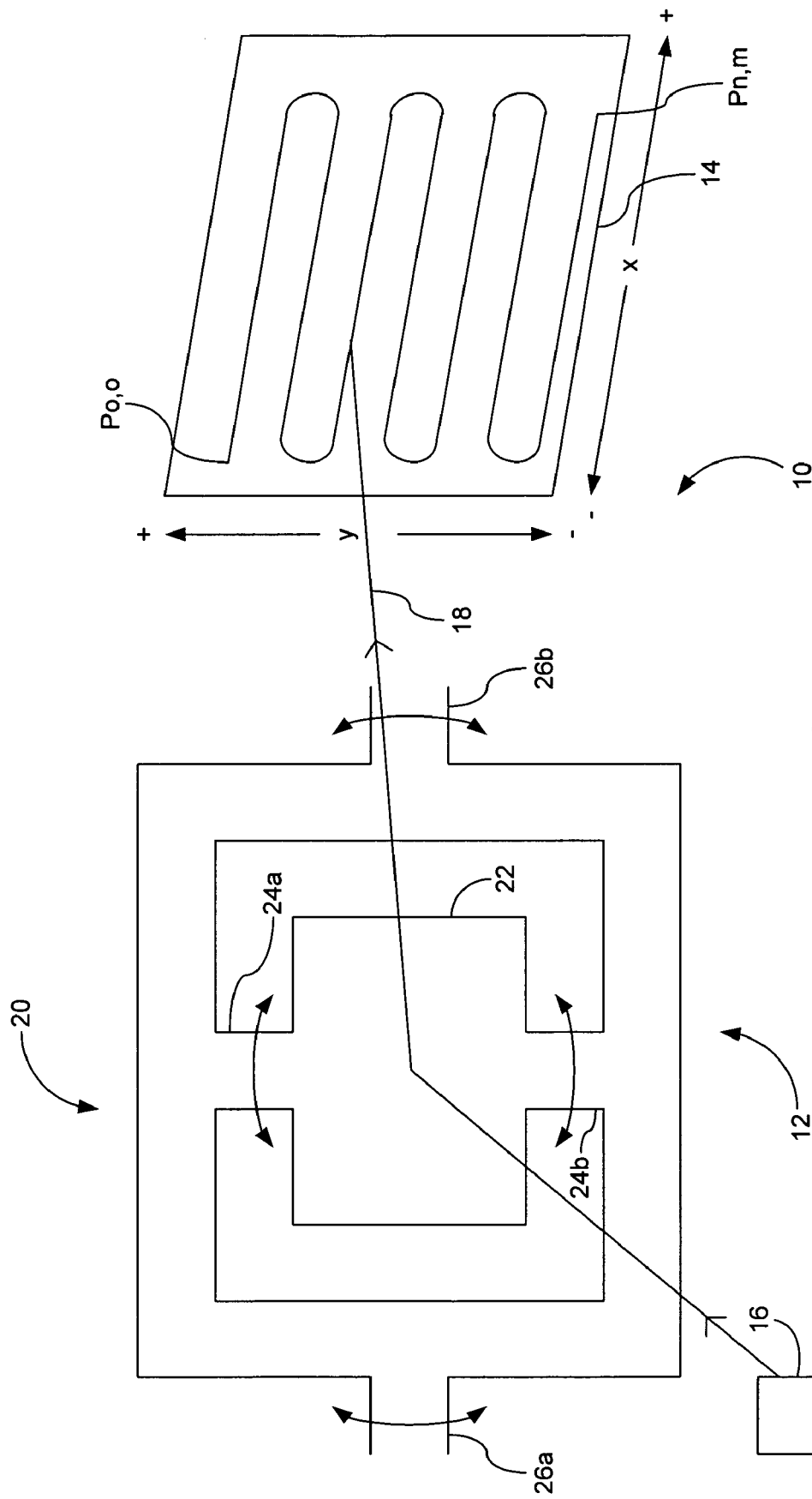
FIG. 1 is a diagram of a conventional optical image-display system.
Figure 2:
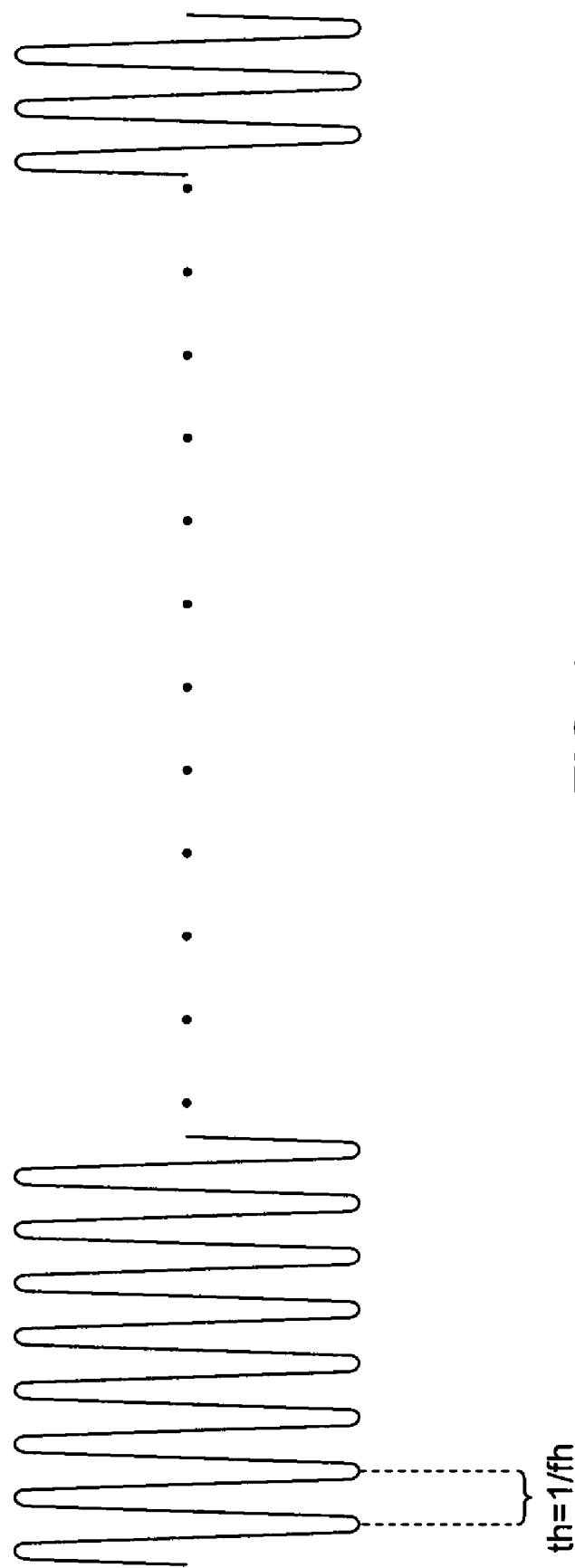
FIG. 2 is a plot of a sinusoid that indicates the position of the image beam of FIG. 1 in the horizontal dimension versus time.
Figure 3:
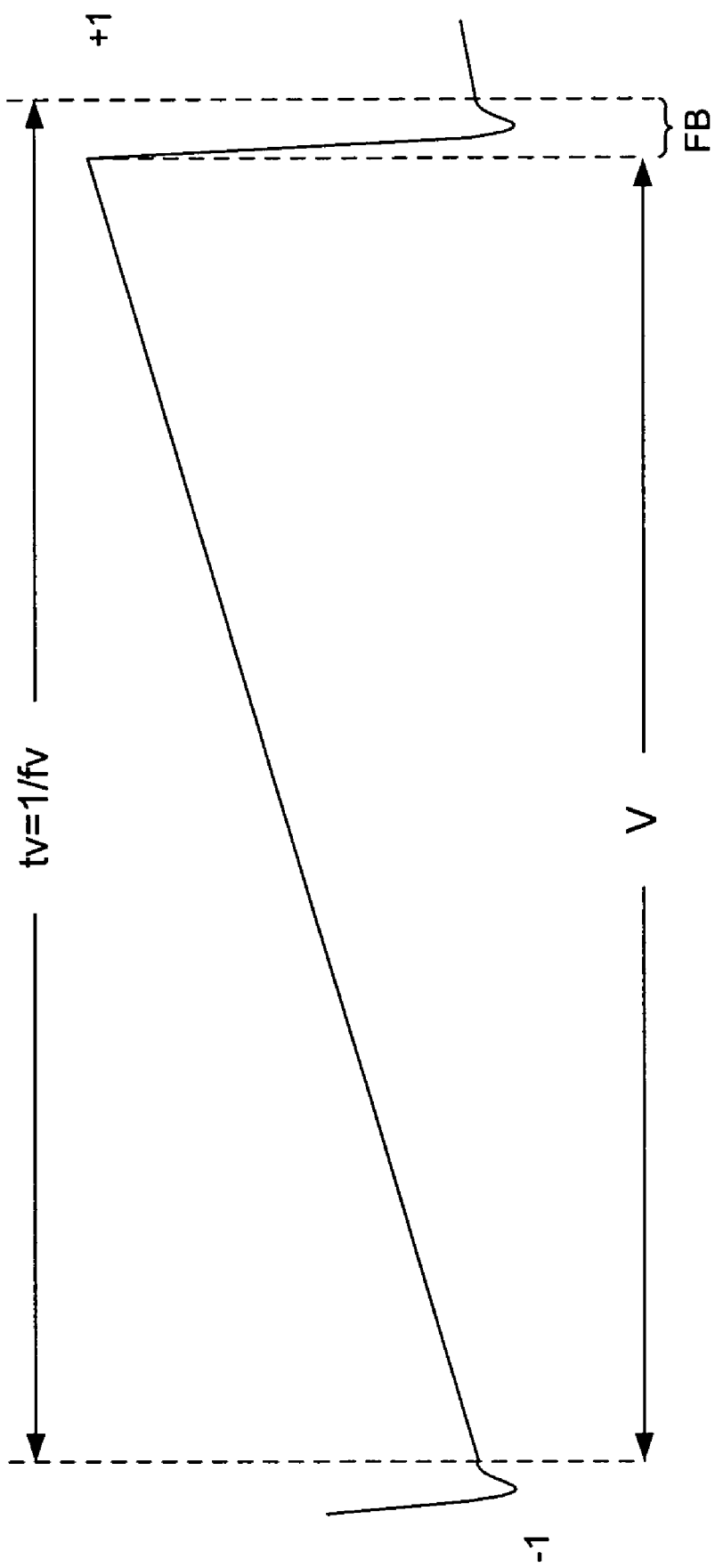
FIG. 3 is a plot of a saw-tooth wave that indicates the position of the image beam of FIG. 1 in the vertical dimension versus time.
Figure 4:
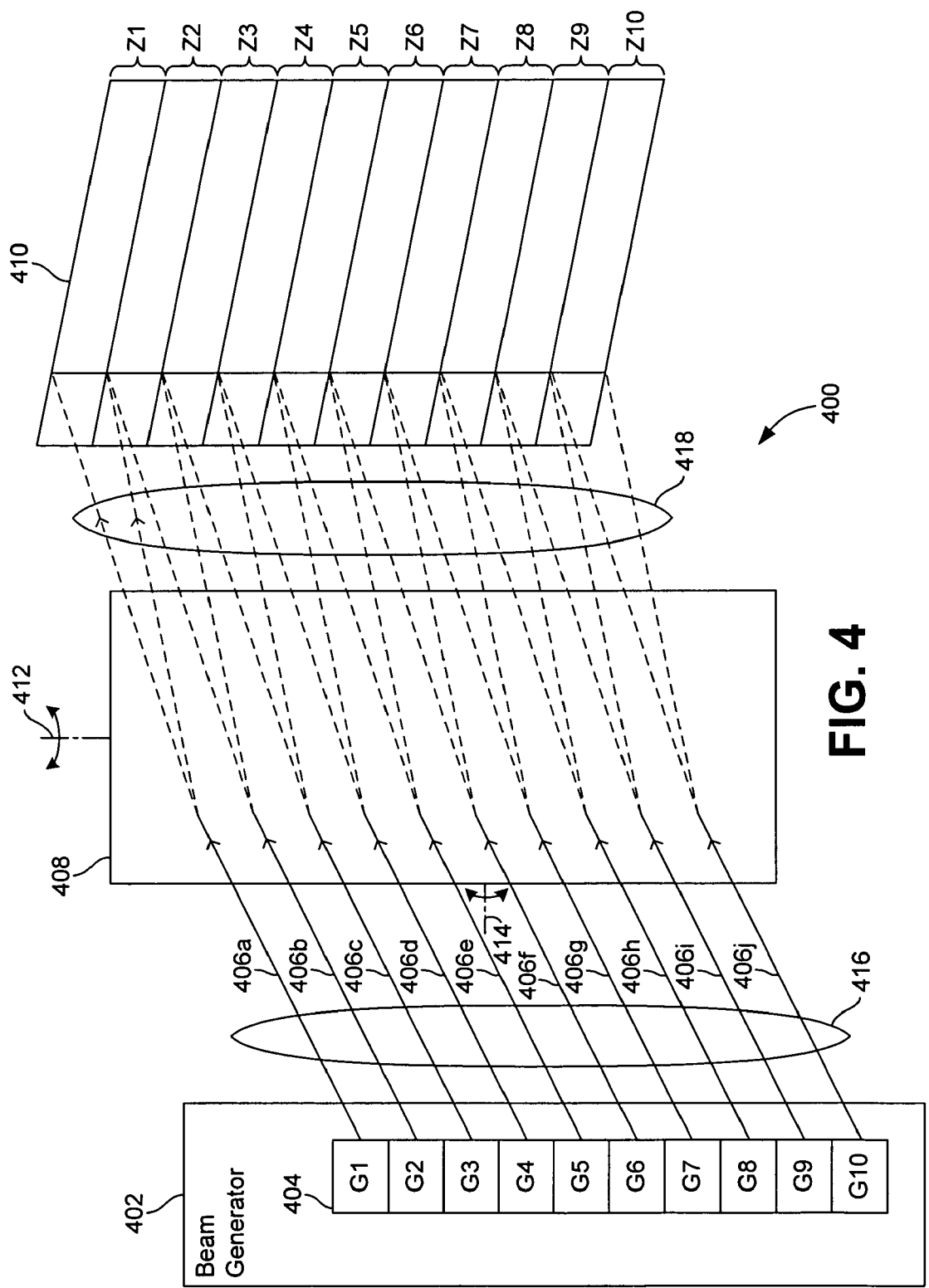
FIG. 4 is a diagram of an optical image-display system including an illuminator array for scanning a plurality of zones on a display according to one embodiment of the present invention.

FIG. 4 is a diagram illustrating an optical image-display system 400 including a beam generator 402 which includes an emitter array 404, which may be formed, for example, from a plurality of surface emitting light emitting diodes (SELEDs) according to one embodiment of the present invention. As shown, discussed, and claimed herein, the term "vertical" will be used to refer to the slow scan or Y axis, and the term horizontal will be used to refer to the fast scan or X axis. It shall be understood that these terms are used to facilitate understanding by the reader. Depending upon system requirements and engineering choices, the fast scan (X) axis may alternatively be aligned vertically. In illuminator or emitter array 404, the individual emitters are arranged in groups G1-G10, with each group generating a corresponding image beam 406a-j that is reflected off a reflector 408 to illuminate a corresponding display zone Z1-Z10 of a screen 410. The emitter array 404 increases the brightness of the field of view or screen 410, compared to the use of a single set of emitters, and facilitates the use of conventional SELEDs (although embodiments according to the present invention are not limited to the use of SELEDs). In one sense, this is true because several light emitters may simultaneously illuminate the screen 410 and thus provide more illuminating power per unit time, making the display on the screen appear brighter. Additionally, the physical positioning of the emitters in the array 404 allows each group G1-G10 of emitters to scan the corresponding zone Z1-Z10 as the reflector 408 rotates about a horizontal axis 412 and a vertical axis 414. Because a single group G1-G10 of emitters need not scan the entire vertical distance Y of the screen 410, the amplitude of the rotation of the reflector 408 about the vertical axis 414 may be reduced relative to the conventional image-display system 10 of FIG. 1. For constant vertical pixel spacing, the horizontal scan speed may be reduced proportionally while maintaining a constant video frame rate. This enables the beams 406a-j to illuminate corresponding pixels on the screen 410 for a longer period of time, which is another way of looking at an increase in brightness of the display on the screen 410 that can result from the use of a plurality of emitter groups. Alternatively, the vertical scanning rate of the reflector 408 may be set at a higher rate and the screen 410 refreshed at a higher frame rate, which can provide superior temporal resolution.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well-known components and/or processes has not been shown or described in detail below to avoid unnecessarily obscuring the present invention.

Figure 5:
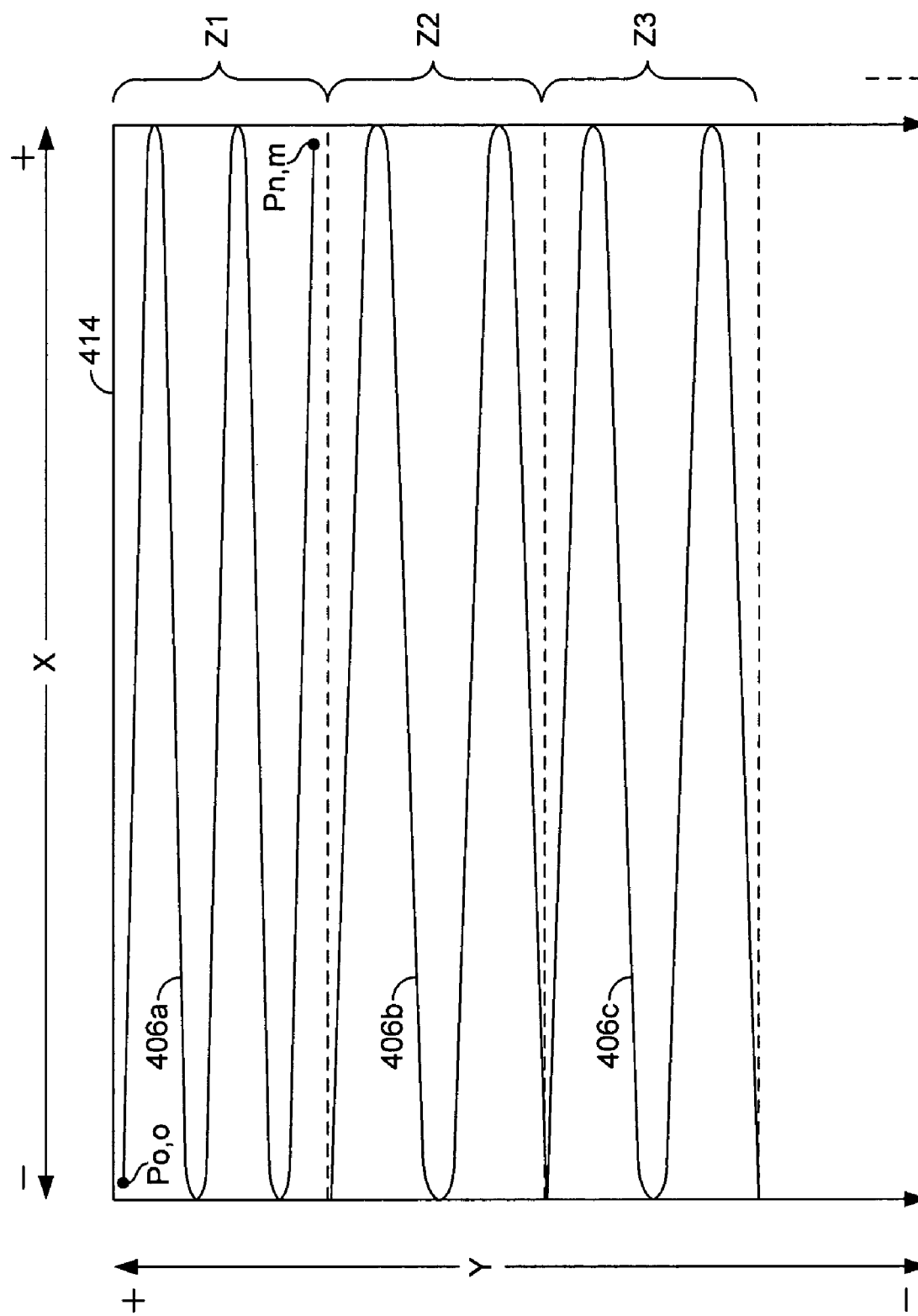
FIG. 5 is a diagram of a front view of the display of FIG. 4 showing the vertical and horizontal scanning of the respective image beams in the plurality of zones on the display during operation of the optical image-display system.

The overall operation of the optical image-display system 400 will now be described in more detail with reference to FIGS. 4 and 5. FIG. 5 is a front view of a portion of the field-of-view or screen of the screen 410 of FIG. 4 showing the vertical and horizontal scanning of the respective image beams 406a, 406b, and 406c in the zones Z1, Z2, and Z3, respectively, during operation of the system 400. The beam generator 402 and reflector 408 operate in combination to simultaneously scan a portion of an overall image being displayed on the screen 410 in each of the zones Z1-Z10. In this way the overall image is displayed on the screen 410 as the sum of the portions of this overall image scanned in each of the zones Z1-Z10. For example, the beam generator 402 modulates the intensity of the image beam 406a to form a first pixel $P_{0,0}$ of the scanned image when the reflector 408 directs the image beam 406a onto a location X=0, Y=0 in the zone Z1. As the reflector 408 sweeps the image beam 406a from top-to-bottom of the zone Z1 and toward a pixel $P_{n,m}$ at a location X=n, Y=m, the beam generator 402 modulates the intensity of the image beam 406a to sequentially form pixels (not shown) of this portion of the image in between the pixels $P_{0,0}$ and $P_{n,m}$. The same is true for the image beams 406b-j and the zones Z2-Z10.

In one embodiment, the beam generator 402 and reflector 408 scan each of the image beams 406 sinusoidally and bi-directionally in the horizontal X direction and bi-directionally and approximately linearly in the vertical Y direction. In another embodiment, the beam generator 402 and reflector 408 sweeps each of the image beams 406a-j sinusoidally and bi-directionally in both the horizontal X and vertical Y dimensions within each of the zones Z1-Z10. An optical image-display system that utilizes sinusoidal and bi-directional scanning in both the horizontal X and vertical Y directions is described in detail in U.S. patent application Ser. No. 10/441, 916 to Brown et al., entitled "APPARATUS AND METHOD FOR BI-DIRECTIONALLY SWEEPING AN IMAGE BEAM IN THE VERTICAL DIMENSION AND RELATED APPARATI AND METHODS," which is incorporated herein by reference.

Referring to FIG. 4, each of the emitters G1-10 in the emitter array 404 emits a beam of light. Each such beam may be formed conventionally using a collimating or focusing lens and/or one or more apertures. The beams 406a-j are transmitted through one or more optional optical elements 416, which directs each beam toward scan mirror or reflector 408. The dotted lines in FIG. 4 represent the image beams 406a-j reflected off the reflector 408 towards the field of view 410 and illustrate the vertical range scanned by each of these image beams. This vertical range defines the corresponding zones Z1-Z10 on the screen 410. One or more optional optical elements 418 direct the scanned image beams toward the field of view 410. In various embodiments, field of view 410 may include a projection screen, a beam expander, the eye of a viewer, etc. For ease of description, the term "field of view" may be used interchangeably herein with the term screen, although as just described the term field of view is not limited to being a screen but includes other devices such as a beam expander, an eye of a viewer, and so on. Although not shown in FIG. 4, each of the zones Z1-Z10 actually overlaps slightly with the adjoining zones to eliminate discontinuities between adjacent zones that could make the overall image look like the sum of several smaller images that are not properly balanced, as will be described in more detail below. The overlap of the zones Z1-Z10 means that adjacent image beams 406 partially scan the same region of the screen 410 to thereby define overlapping or "blending" regions (not shown) between adjacent zones. By modulating the intensity of the image beams 406a-j in these blending regions, discontinuities between zones Z1-Z10 can be eliminated or greatly reduced so that the sum of the image portions displayed in the zones appears as a single unitary image being displayed on the screen 410.

Figure 6:
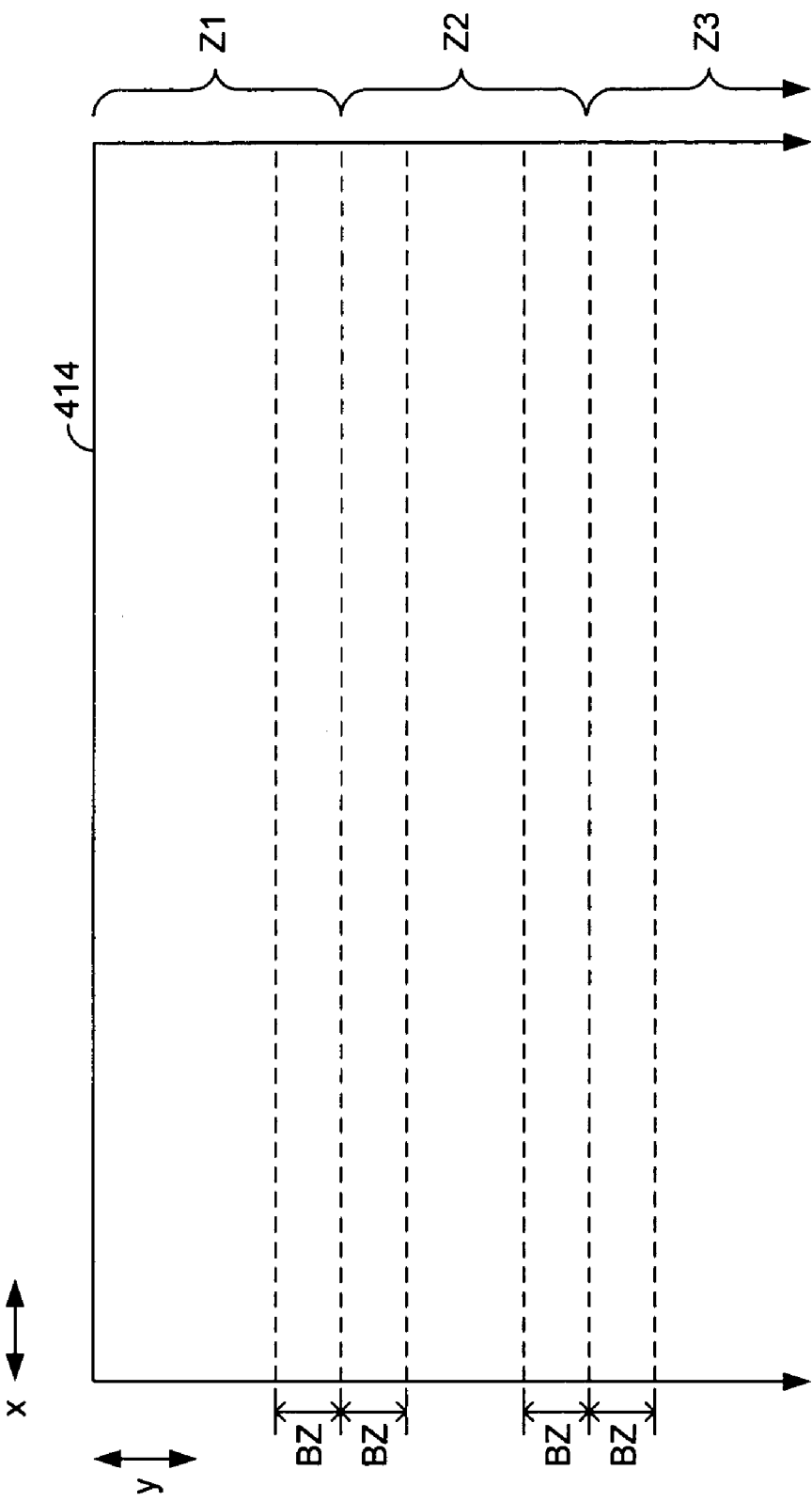
FIG. 6 is a diagram of a front view of the display of FIG. 4 showing blending between a plurality of zones according to one embodiment of the present invention.

FIG. 6 is a front view of a portion of the screen 410 of FIG. 4 showing the blending regions or zones BZ that are generated between adjacent zones Z1-Z10 during operation of the image-display system 400. Recall, the zones Z1-Z10 are defined by the vertical distance scanned by the respective image beams 406a-j as the reflector 408 rotates about the vertical axis 414. The zones Z1-Z10 correspond to the vertical spacing between the emitters of each group G1-G10 of the array 404. The angular rotation of the reflector 408 about the vertical axis 414 and the associated range of vertical beam displacement at screen 410, relative to the vertical spacing of beams associated with vertical emitter spacing defines the vertical distance of the blending zones BZ developed on the screen 410. The greater the angular rotation of the reflector 408 about the vertical axis 414, the greater the vertical distance of the blending zones BZ.

The ten zones Z1-Z10 and corresponding groups G1-G10 of emitters in the embodiment of FIGS. 4-6 are merely presented by way of example, and more or fewer zones and corresponding groups of emitters may be utilized in other embodiments of the present invention. Furthermore, although the zones Z1-Z10 are vertical zones in the embodiments of FIGS. 4-6 the zones may be horizontal zones in other embodiments of the present invention. Typically, the zones Z1-Z10 would be defined in the slower scan direction although this is not necessary in every embodiment. Although the system 400 enables the use of SELEDs in the emitter array 404, the array need not be formed from SELEDs and in other embodiments is formed from other types of light sources, such as edge emitting LEDs or laser diodes, for example.

Figure 7:
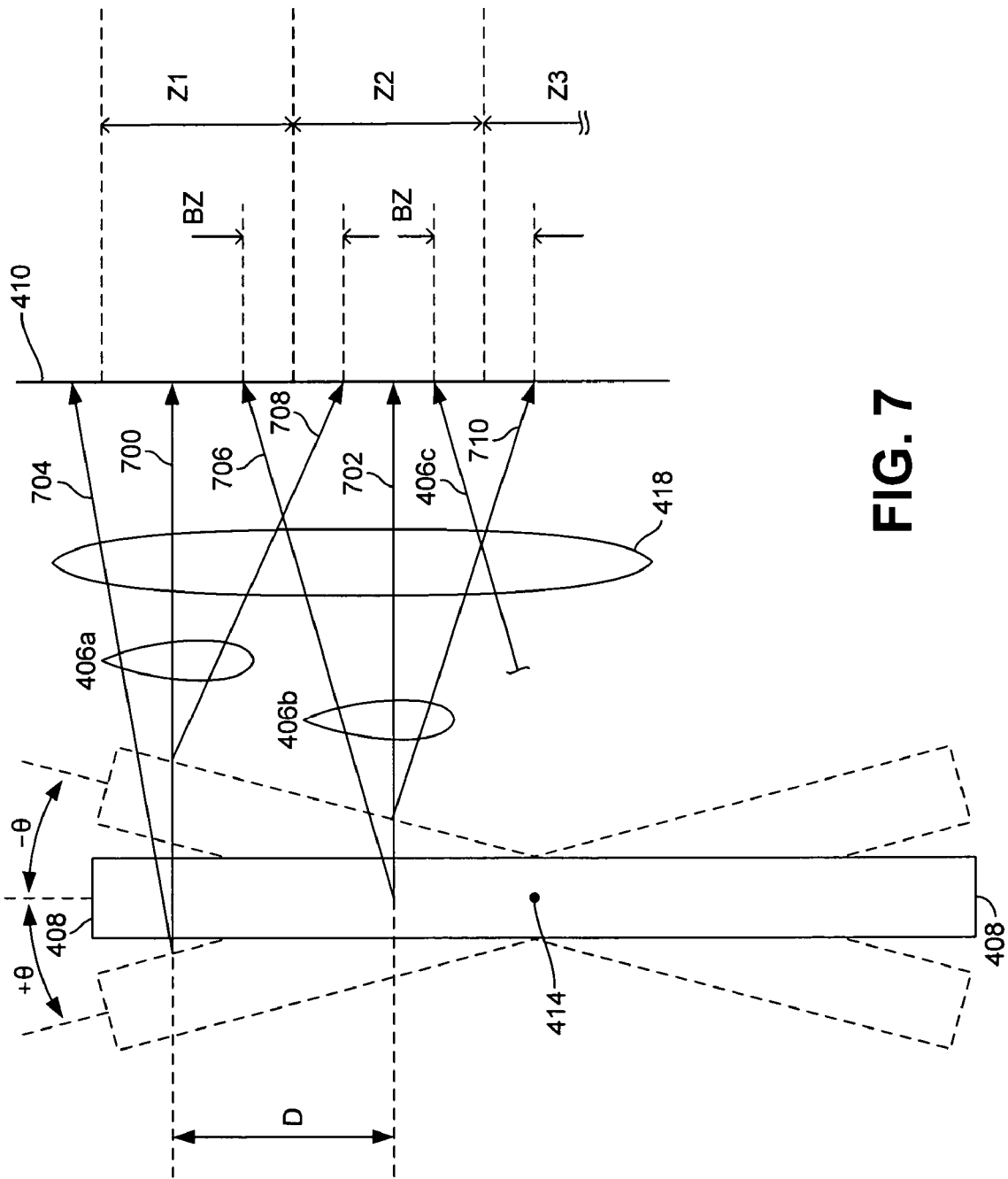
FIG. 7 is a side view of the display of FIG. 4 showing blending between a plurality of zones according to another embodiment of the present invention.

FIG. 7 is a functional diagram showing the rotation of the reflector 408 about the vertical axis 414 and the resultant path of the image beams 406a and 406b reflected off the reflector. The reflector 408 is shown as a solid line at a rotation of zero degrees rotation about the vertical axis 414 and is also shown in a fully rotated positive position at an angle θ and a fully rotated negative position −θ about the vertical axis. In the zero degree position, the image beam 406a corresponds to the image beam 700 and the image beam 406b corresponds to the image beam 702. When the reflector 408 is positioned at the fully rotated positive position θ, the image beams 406a and 406b correspond to the image beams 704 and 706, respectively. When the reflector 408 is positioned at the fully rotated negative position −θ, the image beams 406a and 406b correspond to the image beams 708 and 710, respectively.

As the reflector 408 moves between the positions θ and −θ, the image beam 406a sweeps on the screen 410 from the position indicated by beam 704 to the position indicated by beam 708 to thereby scan the vertical zone Z1. At the same time, as the reflector 408 moves between the positions θ and −θ the image beam 406b sweeps on the screen 410 from the position indicated by beams 706 to the position indicated by beam 710 to thereby scan the vertical zone Z2. Because each beam 406a and 406b scans a vertical distance greater than D, where D is the projected distance between adjacent groups G1-G10 (FIG. 4) in the array 404 (FIG. 4) on screen 410, the zones Z1 and Z2 overlap, defining a blending zone BZ between the zones as shown in FIG. 7. The vertical height of the blending zones BZ depends on the value of the angle θ. The image beam 406c is shown in its uppermost position, which corresponds to the reflector 408 being rotated about the vertical axis 414 to the position θ, and illustrates that a blending zone BZ is also formed between the blending zones Z2 and Z3.

As previously mentioned, by modulating the intensity of the image beams 406a-j in these blending regions as functions of vertical angle θ, the discontinuities between zones Z1-Z10 can be eliminated or greatly reduced. A variety of different algorithms for modulating the intensities of the respective image beams 406a-j in the blending zones BZ may be utilized. In one embodiment of the present invention, the instantaneous intensities of adjacent image beams 406a-j are each multiplied by a corresponding linearly varying blending coefficient $B_{coe}$. The blending coefficient $B_{coe}$ linearly increases for a first one of the image beams 406a-j and linearly decreases for a second one of the image beams in each blending zone BZ. Although the intensity of each image beam 406a-j is described as being multiplied by the corresponding blending coefficient $B_{coe}$, this is done merely to simplify the present description. Drive signals are actually applied to each group G1-G10 of SELEDs, and the magnitude of these drive signals determines the intensity of the image beam 406a-j generated by the group. It is the magnitude of the drive signals that are adjusted via multiplication by the blending coefficient $B_{coe}$ to thereby adjust the intensity of the image beams 406a-j.

Figure 8:
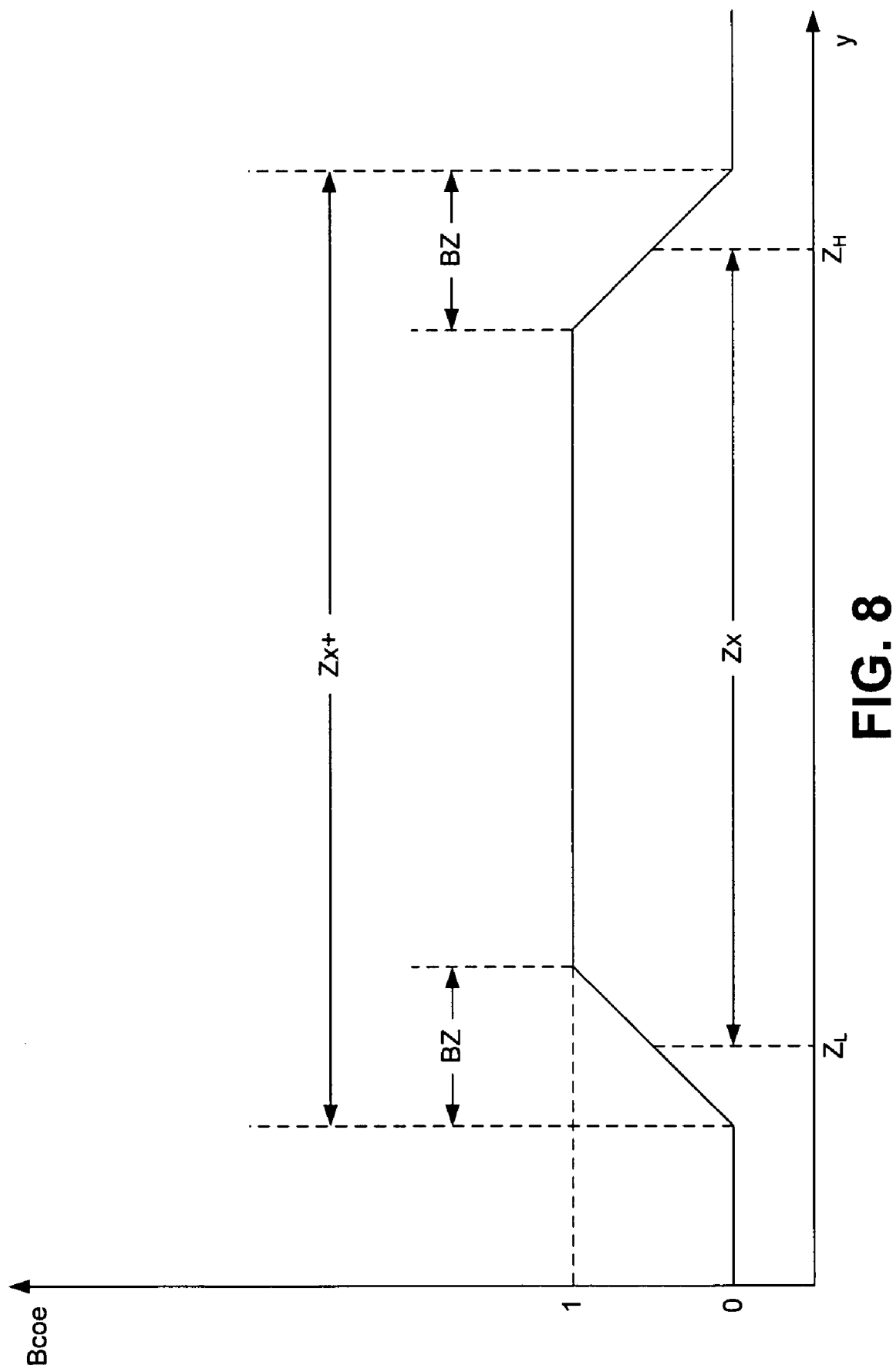
FIG. 8 is a graph of the blending coefficient associated with each image beam of FIG. 4 as a function of vertical distance in the corresponding zone according to one embodiment of the present invention.

FIG. 8 is a graph illustrating the blending coefficient $B_{coe}$ applied to each image beam 406a-j according to one embodiment of the present invention. The vertical axis of the graph illustrates the magnitude of the coefficient $B_{coe}$ and the horizontal axis indicates the vertical position Y of the image beam 406a-j within the corresponding zone Z1-Z10. In FIG. 8 a zone low point $Z_L$ and a zone high point $Z_H$ on the Y-axis define the vertical zone associated with the spacing between neighboring emitters for a given image beam 406a-j, with the zone being indicated generically as ZX. The range indicated generically as ZX+ shows an extended vertical range associated with overscan by the scan mirror 408 in the vertical axis. For example, where ZX corresponds to the second vertical zone Z2 the associated image beam is the image beam 406b and the blending coefficient $B_{coe}$ is applied to modulate the intensity of this image beam. A first blending zone BZ is centered around the zone low point $Z_L$ and a second blending zone BZ is centered around the zone high point $Z_H$. In the blending zones BZ, the blending coefficient $B_{coe}$ linearly transitions between the values 0 and 1. More specifically, the blending coefficient $B_{coe}$ is given by the following equations:

$$B_{coe} = \begin{cases} 0 & \text{for } Z_L - \frac{BZ}{2} > Y \text{ or } Y > Z_H + \frac{BZ}{2} \\ \frac{1}{2} - \frac{Z_L - Y}{BZ} & \text{for } Z_L - \frac{BZ}{2} < Y \le Z_L + \frac{BZ}{2} \\ 1 & \text{for } Z_L + \frac{BZ}{2} < Y \le Z_H - \frac{BZ}{2} \\ \frac{1}{2} - \frac{Y - Z_H}{BZ} & \text{for } Z_H - \frac{BZ}{2} < Y \le Z_H + \frac{BZ}{2} \end{cases}$$

As seen from these equations and from the graph of FIG. 8, the blending coefficient $B_{coe}$ has a value of 1 when in the zone ZX but not in the blending zone BZ. In the blending zones BZ, the blending coefficient $B_{coe}$ linearly transitions from the value 1 to the value 0. For values of Y beyond the values associated with the zone ZX and the blending zones BZ, the blending coefficient has a value of 0.

Figure 9:
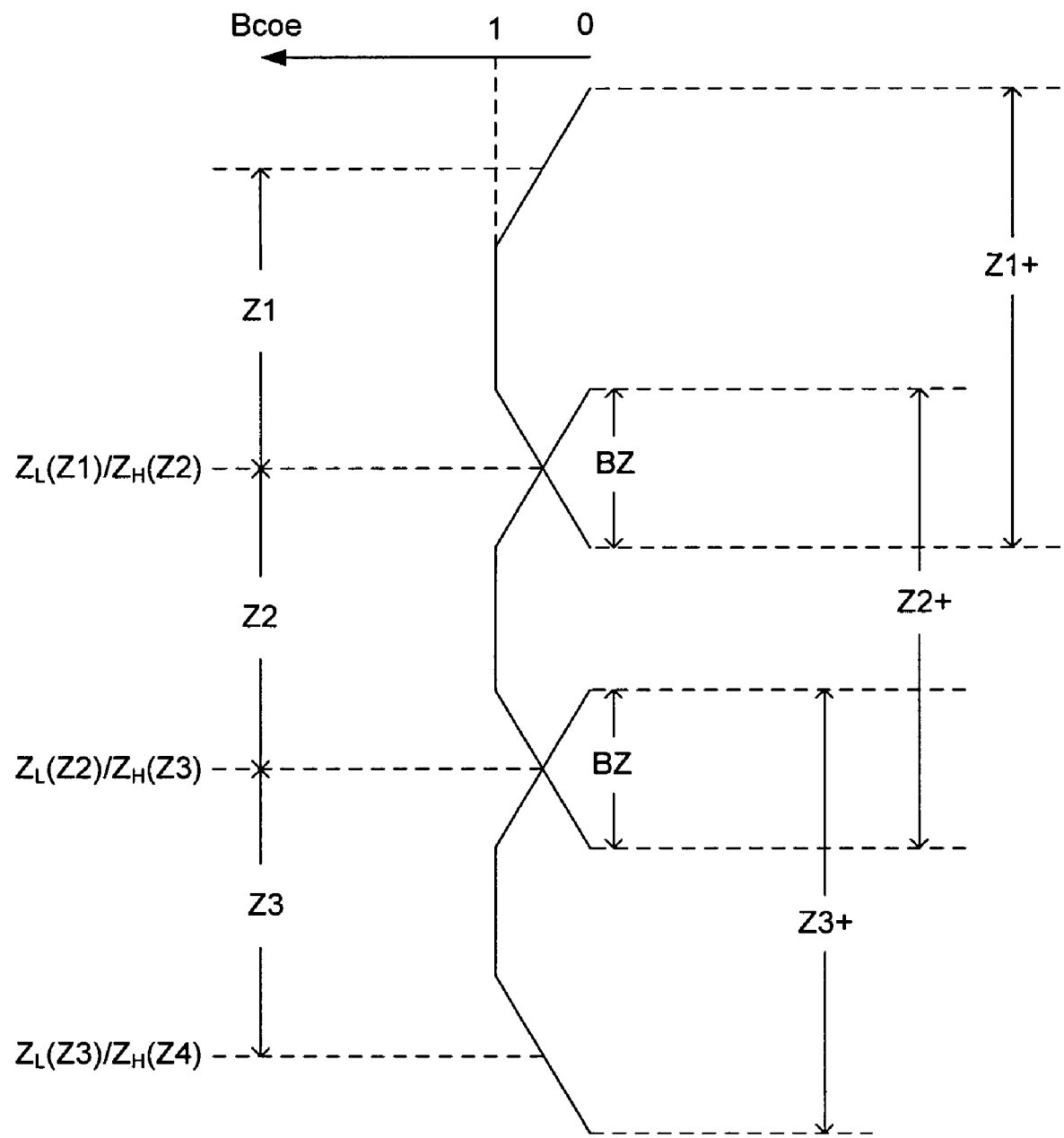
FIG. 9 is a diagram illustrating the blending coefficient of FIG. 8 for several adjacent vertical zones of FIG. 4.

FIG. 9 is a diagram illustrating the blending coefficients $B_{coe}$ of FIG. 8 for several adjacent vertical zones Z1-Z3 in the screen 410 of FIG. 4. This diagram illustrates that in the blending zones BZ between adjacent zones Z1-Z10, the blending coefficients $B_{coe}$ for one zone linearly increases while the blending coefficient for the other zone linearly decreases. For example, in the blending zone defined between the zones Z1 and Z2 the blending coefficient $B_{coe}$ associated with zone Z1 linearly increases while the blending coefficient associated with zone Z1 linearly decreases. The endpoint demarcating the zones Z1 and Z2 corresponds to the zone low point $Z_L$ for the zone Z1 and the zone high point $Z_H$ for the zone Z2, designated $Z_L(Z1)$ and $Z_H(Z2)$ respectively. The same is shown between zones Z2 and Z3, with the endpoint corresponding to the zone low point $Z_L$ for the zone Z2 and the zone high point $Z_H$ for the zone Z3 that are designated $Z_L(Z2)$ and $Z_H(Z3)$, respectively. Notice that the image beam 406a-j that scans each zone Z1-Z10 actually scans a vertical distance ZX+ that extends a distance of BZ/2 beyond the end points defining the zone. As used herein, it is to be understood that descriptions of the full vertical scanning extent of the beams making up zones Z include the somewhat larger vertical scanning distance Z+ formed by vertical over-scanning used to create the blending zones.

The variation of the blending coefficient $B_{coe}$ in the blending zones BZ may be termed a "blending algorithm" since the coefficient modulates the intensities of the corresponding image beams 406a-j to smooth or blend the images formed in adjacent zones Z1-Z10. Blending algorithms other than the described linear algorithm may also be utilized. Moreover, different blending algorithms could also be utilized between different blending zones is some situations. In some embodiments, the precise blending algorithm used between adjacent zones Z1-Z10 may be individually determined for each pair of adjacent zones.

Figure 10:
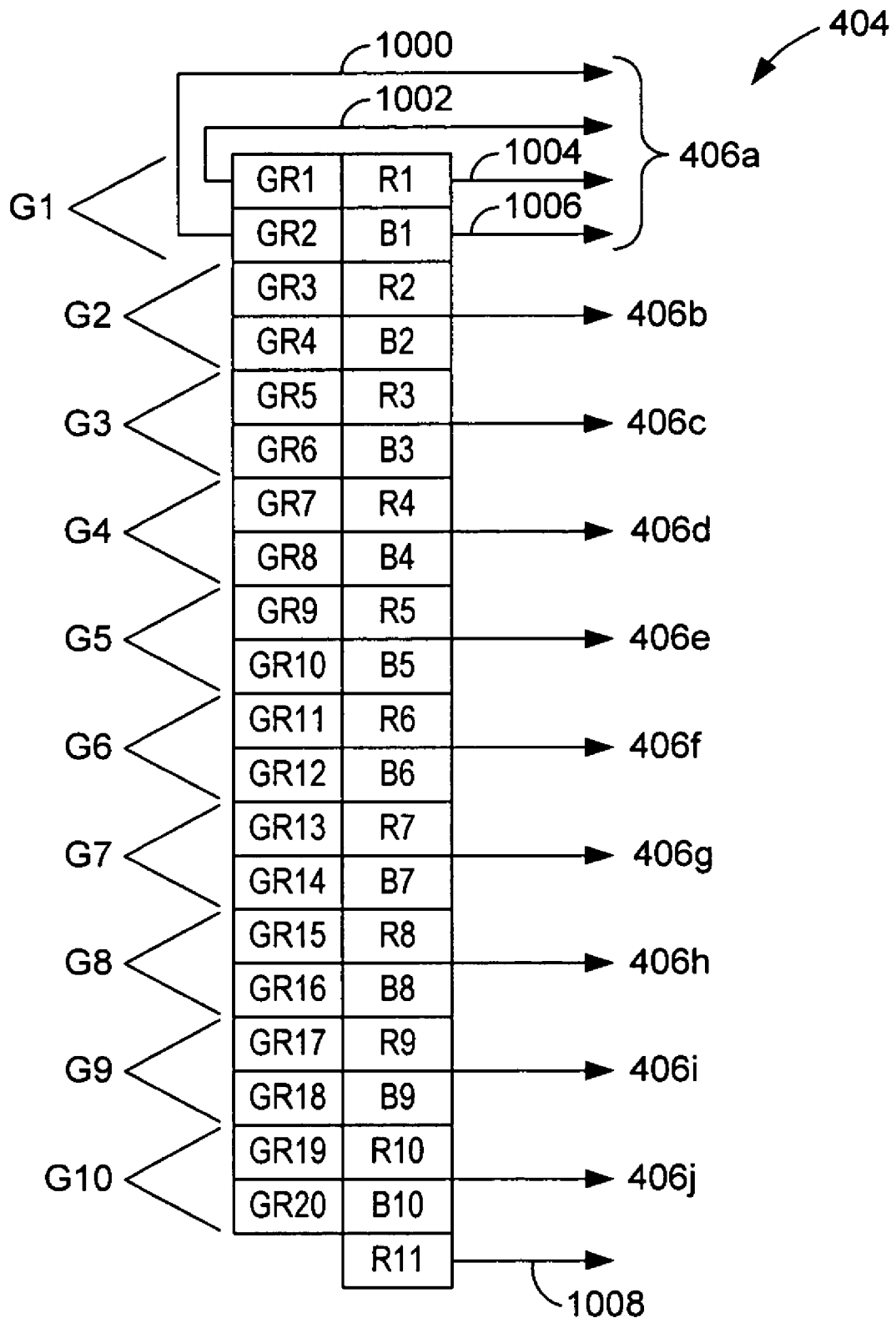
FIG. 10 is a front view of the illuminator array of FIG. 4 according to one embodiment of the present invention.

Returning now to FIG. 4, each group G1-G10 of emitters in the emitter array 404 of the beam generator 402 modulates video information onto the corresponding image beam 406a-j. Each group G1-G10 may be formed from single colored light sources or from multiple colored light sources such as red, green and blue SELEDs, for example. FIG. 10 is a front view of an emitter array 404 including twenty green emitters GR1-GR20 arranged in a first column and an adjacent column of alternating red emitters R1-R11 and blue emitters B1-B10 according to one embodiment of the present invention. The front side shown in FIG. 10 is the side of the array 404 from which the GR, B, and R devices emit light.

In the embodiment of FIG. 10, each group G1-G10 includes a pair of green emitters along with a single red and a single blue emitter. For example, the group G1 includes the two green emitters GR1, GR2 along with the red emitter R1 and blue emitter B1. The green emitter GR1 may be physically positioned in-line with and adjacent the red emitter R1 and the green emitter GR2 may be physically positioned in-line with and adjacent the blue emitter B1. The two green emitters GR1, GR2 emit image beams 1000, 1002, the red emitter R1 emits an image beam 1004, and the blue emitter B1 emits an image beam 1006. The image beams 1000-1006 collectively form the image beam 406a emitted by the group G1 as previously discussed with reference to FIG. 4. Although the individual image beams for the green emitters GR, red emitters R, and blue emitters B for the remaining groups G2-G10 are not shown, each individual emitter in each group emits a corresponding image beam and the beams collectively form the image beams 406b-j as indicated. The red emitter R11 is used in part to augment the lower end of the red beam range Z10 beyond the scan range of red emitter R10 such that Z10 extends to the end of the range defined by green emitter GR20. The red emitter R11 is also used in part to provide an image beam 1008 beyond a normal field of view formed by the SELEDS in the groups G1-G10. The extended range portion of image beam 1008 (that portion of its range that extends beyond the bottom of the screen) is utilized to monitor the phase or position of the image being generated on the screen 410 during operation of the image-display system 400, as will be explained in more detail below. As may be appreciated, an extra blue emitter B0 could similarly be placed at the upper end of the right column of emitter array 404 to extend the upper vertical range of blue pixels to substantially equal the upper vertical range of the green pixels produced by green emitter GR1. Optionally, such an extra blue emitter could be used to provide location or phase feedback to the system.

Recall from the description of the image-display system 400 with reference to FIGS. 4 and 5, the image beam 406a-j from each group G1-G10 of emitters illuminates a corresponding zone Z1-Z10 on the screen 410. Thus, in the embodiment of FIG. 10 the two green emitters GR along with one red emitter R and one blue emitter B in each group G1-G10 together illuminate the corresponding zones Z1-Z10 in the screen 410. The intensities of the red R, green G, and blue B emitters in each group G1-G10 are controlled to generate the desired color for each pixel in the corresponding zone Z1-Z10. For example, the intensities of the green emitters GR1, GR2, red emitter R1, and blue emitter B1 are adjusted for each pixel in the zone Z1 to generate the desired color for each pixel. Moreover, each of the green GR, red R, and blue B emitters in a group G1-G10 has its intensity adjusted by the blending coefficient $B_{coe}$ for the corresponding zone Z1-Z10. For example, the intensity of each of the image beams 1000-1006 for the emitters in group G1 is adjusted by the blending coefficient $B_{coe}$ for the zone Z1.

The ratio of two green GR for each red R and blue B emitter in a group G1-G10 provides two benefits. First, since for some embodiments green emitters output a lower maximum beam intensity than do red and blue emitters, the extra green emitter provides the required intensity to achieve a sufficiently full color spectrum for pixels in the screen 410, especially at high luminance. Secondly, the human eye has more spatial sensitivity to wavelengths of light corresponding to the color green, and the two green emitters in each group G1-G10 provide the sensation of higher resolution of an image displayed on the screen 410. For example, when the two green GR, red R, and blue B emitters all provide a balanced intensity of light, the perceived color is white. Due to the physical operating characteristics of the two green GR, one red R, and one blue B emitters, this combination for each group G1-G10 provides good spectral range and good dynamic range for the screen 410.

Figure 11:
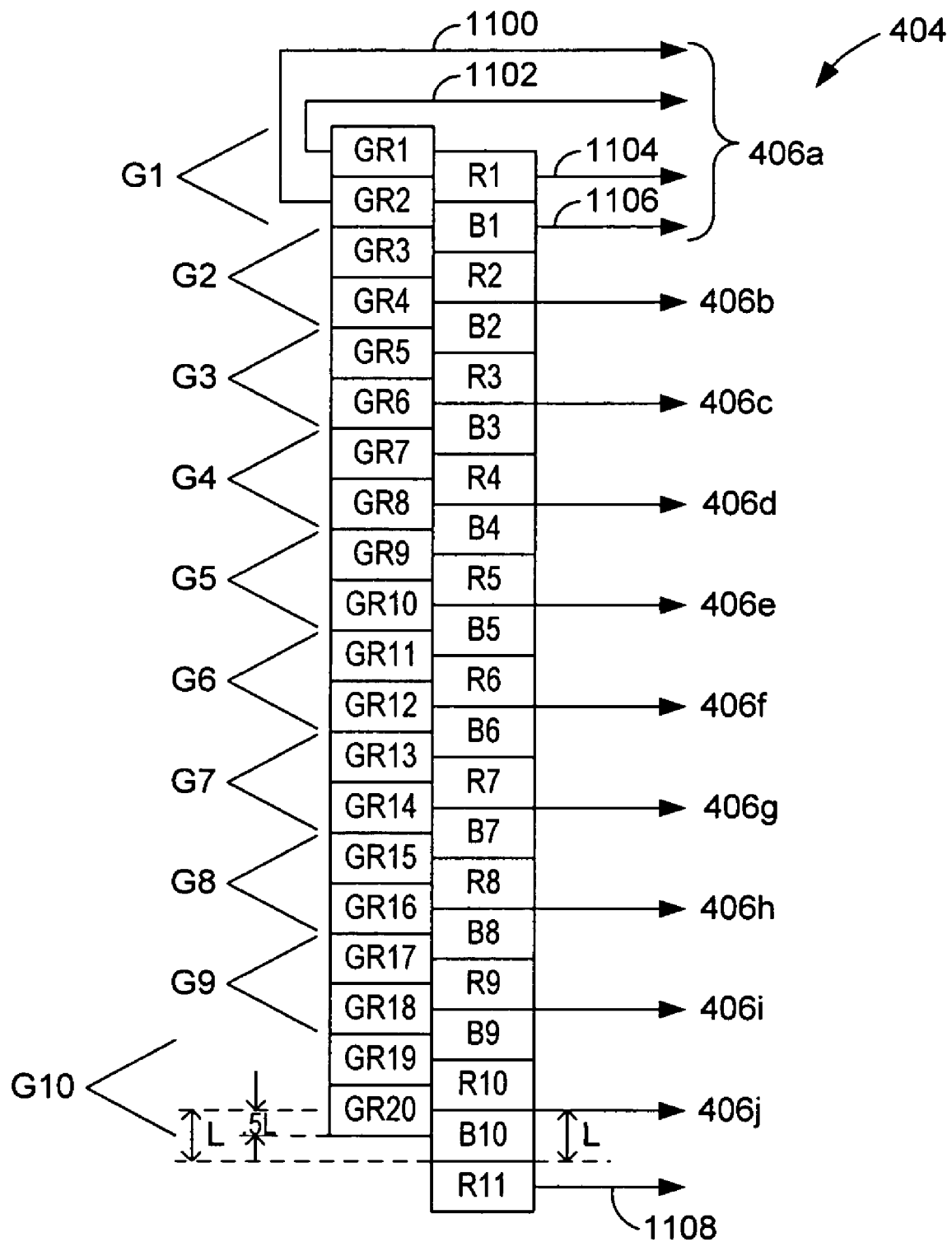
FIG. 11 is a front view of the illuminator array of FIG. 4 according to another embodiment of the present invention.

FIG. 11 is a front view of an emitter array 404 of FIG. 4 according to another embodiment of the present invention. In this embodiment, the array 404 once again includes twenty green emitters GR1-GR20 arranged in a first column and an adjacent column of alternating red emitters R1-R11 and blue emitters B1-B10. In contrast to the embodiment of FIG. 10, however, each green emitter GR1-GR20 is offset relative to the adjacent red R and blue B emitters. Each square representing an emitter in FIG. 7 is assumed to have a length L, as shown for the blue emitter B10. Each of the green emitters GR1-GR20 is offset relative to the dice for the adjacent blue B and red R emitters by one-half the length L, as shown for the green emitter GR20 relative to the blue emitter B10. Relative to the embodiment of FIG. 10, the column of green emitters GR1-GR20 is shifted upward by the ½ L in the embodiment of FIG. 11. The red emitter R11 is used in part to augment the lower end of the red beam range Z10 beyond the scan range of red emitter R10 such that Z10 extends to the end of the range defined by green emitter GR20. The red emitter R11 is also used in part to provide an image beam 1108 beyond a normal field of view formed by the SELEDS in the groups G1-G10. The extended range portion of image beam 1108 (that portion of its range that extends beyond the bottom of the screen) is utilized to monitor the phase or position of the image being generated on the screen 410 during operation of the image-display system 400. In the embodiment of FIG. 11, an extra blue emitter B0 (not shown) could similarly be placed at the upper end of the right column of emitter array 404 to extend the upper vertical range of blue pixels to substantially equal the upper vertical range of the green pixels produced by green emitter GR1. Optionally, such an extra blue emitter B0 could be used to provide location or phase feedback to the system. The reference numbers 1100-1106 correspond to the numbers 1000-1006 in FIG. 10, and thus will not be described in more detail.

In other embodiments of the emitter array 404, the relative orientation between the red, green, and blue emitters may vary. For example, referring to FIG. 11 in another embodiment the green emitters GR1-GR20 are shifted upward as shown but the alternating order of blue emitters B1-B10 and red emitters R1-R10 in the right column is reversed, with an extra red emitter R11 being positioned at the top of the right column. Thus, in this embodiment the emitters are positioned as shown in FIG. 11 except that the emitter R11 is positioned at the top of the right column adjacent the emitter GR1. Moreover, each red emitter R1-R10 is a blue emitter B1-B10, respectively, and each blue emitter B1-B10 is a red emitter R1-R10, respectively. The emitter R11 is therefore positioned at the top of the right column of blue and red emitters adjacent the green emitter GR1 and the blue emitter B1. In yet another embodiment, the green emitters GR1-GR20 are shifted down relative to the red emitters R1-10 and blue emitters B1-B10 and an extra red emitter R11 included at the bottom of the right column of blue and red emitters.

Offsetting the green GR, red R, and blue B emitters in this way results in offsetting the vertical "blending zones" of the green, blue, and red emitters, which may improve the quality of the image on the screen 410 in some applications of the image-display system 400. This is true because although the green GR, red R, and blue B emitters in each group G1-G10 are discussed as if being coincident in space, this is not the case as seen in FIGS. 10 and 11. The GR, B, and R emitters in each group G1-G10 are positioned adjacent one another, causing the beam from each SELED to scan a slightly different region of the screen 410. Ideally, the beams from the GR, B, and R emitters in each group G1-G10 would be emitted from the same physical location, meaning that each beam would scan exactly the same zone Z1-Z10 of the screen 410. Shifting the physical positioning of the GR, B, and R emitters within each group G1-G10 shifts the precise zone scanned on the screen 410 by each, and this shifting may in some situations improve the overall quality of the image being generated on the screen.

Figure 12:
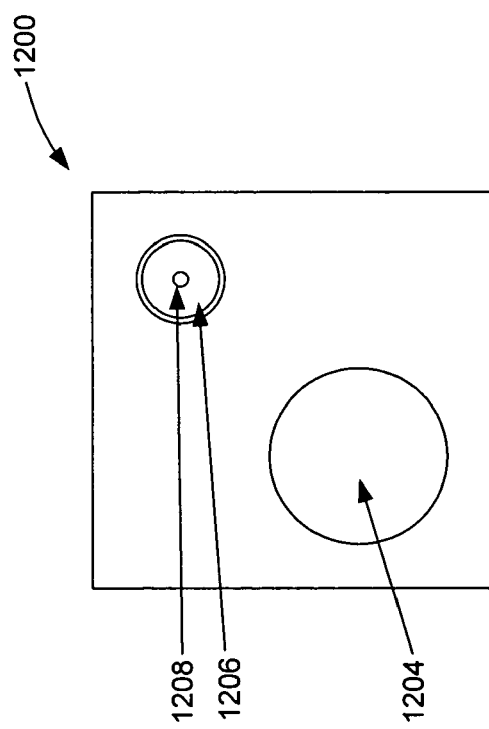
FIG. 12 is a front view of one embodiment of an individual SELED chip corresponding to one of the individual red, blue, or green SELEDs contained in embodiments of the arrays of FIGS. 10 and 11.

As indicated above, construction and operation of an image-display system using an array of emitters as described herein can enable the use of surface emitting light emitting diodes (SELEDs). FIG. 12 is a top view of an individual SELED chip 1200 corresponding to one of the individual GR, B, or R SELEDs contained in the embodiments of an emitter array 404 of FIGS. 10 and 11 using SELED light sources. The SELED chip 1200 includes a substrate 1202 that functions as a cathode and a p-type anode contact 1204. An active area 1206 is the region of the SELED chip 1200 that emits photons, and these photons in the form of visible light are emitted through an emitting aperture 1208. Suitable structures, operation, and suitable materials for forming the SELED chip 1200 will be understood by those skilled in the art, and thus, for the sake of brevity, will not be described in more detail herein. The precise structure and materials of the SELED chip 1200 are determined by the color of light to be generated. The individual SELED chips 1200 of suitable colors are physically assembled to form the array 404 of FIG. 10 or 11, with the specific positioning being determined by the particular embodiment being formed.

Figure 13:
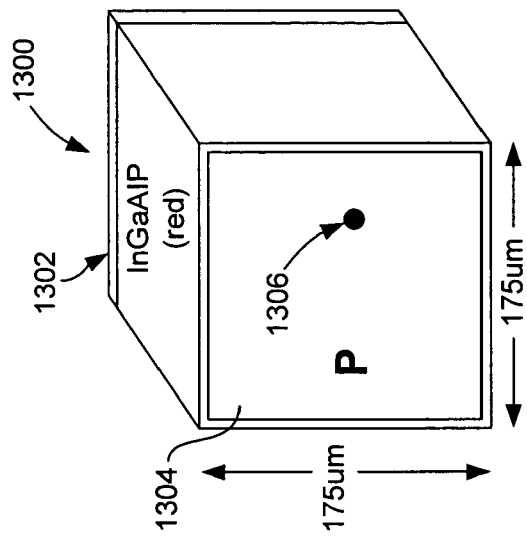
FIG. 13 is an isometric view of one embodiment of a red SELED chip corresponding to one of the red illuminators in the arrays of FIGS. 10 and 11.
Figure 14:
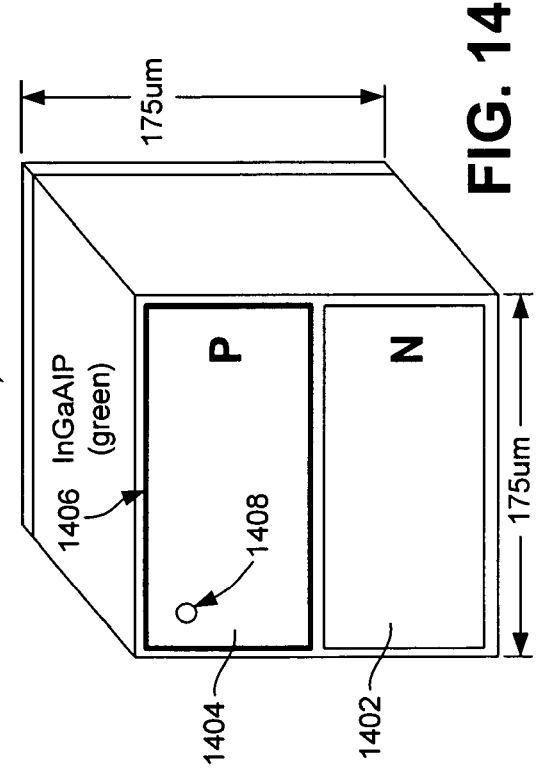
FIG. 14 is an isometric view of one embodiment of a green SELED chip corresponding to one of the green illuminators in the arrays of FIGS. 10 and 11.

Because of the desire to keep the emitting apertures 1208 of the SELED chips 1200 in each group G1-G10 as close together as possible, the overall size of the chips must be considered. FIGS. 13 and 14 are isometric views of a red SELED chip 1300 and a green SELED chip 1400, respectively, according to one embodiment of the present invention. The red SELED chip 1300 is an Indium Gallium Aluminum Phosphide (InGaAlP) SELED that includes a cathode contact 1302, p-type anode region 1304, and an emission aperture 1306 on an upper surface of the chip. In the embodiment of FIG. 13, the emission aperture 1306 has a diameter of approximately 10 μm and the upper surface of the chip 1300 has sides of approximately 175 μm in length. The green SELED chip 1400 is an Indium gallium nitride (InGaN) SELED that includes a cathode contact 1402, an anode contact 1404 surrounded by a mesa area 1406, and an emission aperture 1408 on an upper surface of the chip. In the embodiment of FIG. 14, the emission aperture 1408 has a diameter of approximately 10 μm and the upper surface of the chip 1400 has sides of approximately 275 μm in length. One embodiment of a blue SELED chip (not shown) is substantially the same as the green SELED chip 1400, with regions of the chip suitably doped and formed to generate the desired blue light. These red, blue, and green SELEDs chips are assembled to form the array 404 of FIGS. 10 or 11.

Figure 15:
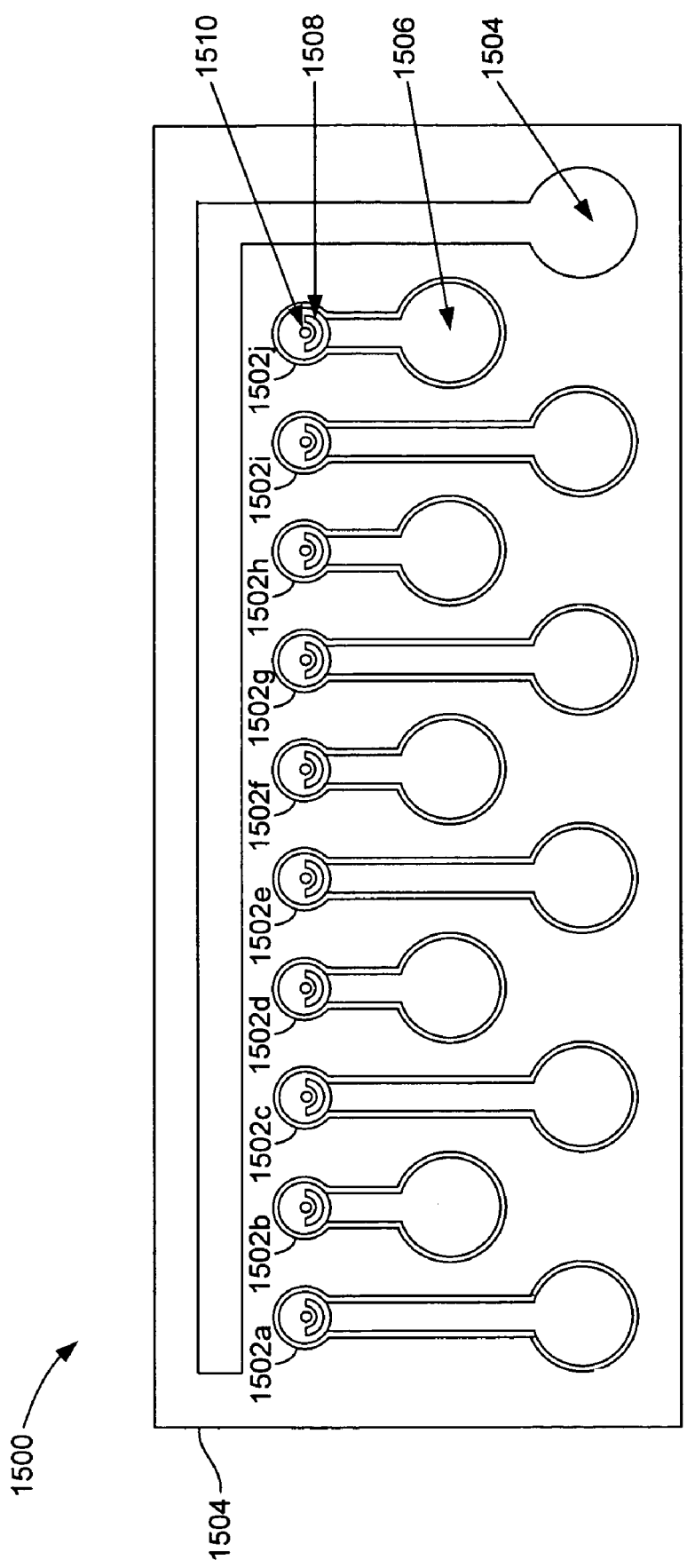
FIG. 15 is a front view of an N×1 subarray of green SELEDs according to one embodiment of the present invention.

In another embodiment of the array 404 of FIGS. 10 and 11, the array is formed from individual red SELED chips 1300, individual blue SELED chips having the same physical dimensions as the SELED chip 1400, and from at least one N×1 subarray 1500 of green SELEDs as shown in FIG. 15. The subarray 1500 includes 10 (N=10) individual green SELEDs 1502*a-j* formed on a common substrate 1504. A cathode contact 1506 is common to all the SELEDs 1502*a-j* and each SELED further includes an individual anode contact 1506, which is shown only for the SELED 1502*j*. Each green SELED 1502*a-j* further includes an active region 1508 and emission aperture 1510, which once again are shown only for the SELED 1502*j*. In one embodiment of the subarray 1500, the active regions 1508 have diameters of approximately 34 μm and the emission apertures 1520 have diameters of approximately 8 μm.

Figure 16:
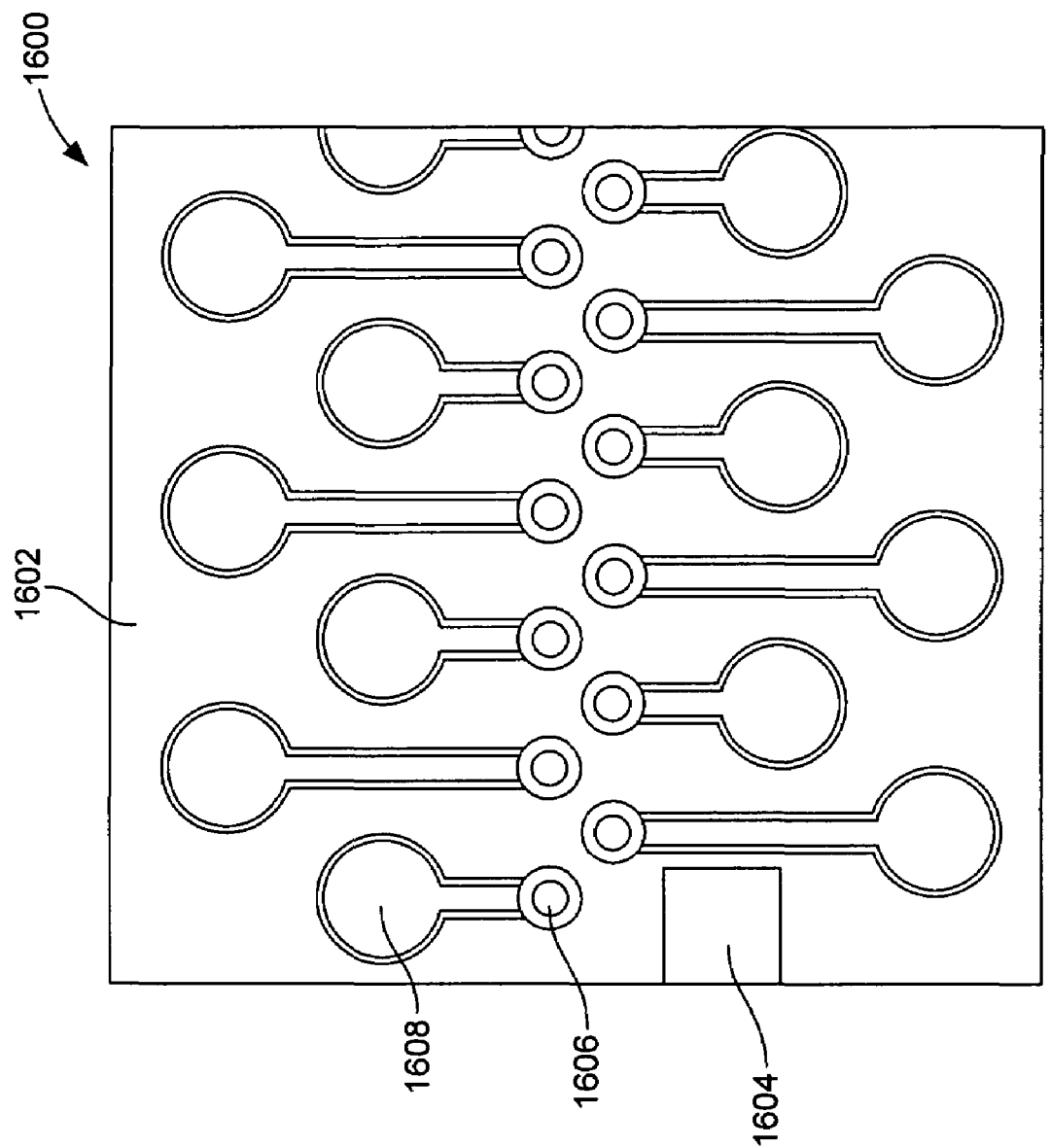
FIG. 16 is a front view of a portion of an integrated SELED array corresponding to one embodiment of the illuminator array of FIG. 11.

FIG. 16 illustrates a portion of an integrated array 1600 corresponding to one embodiment of the array 404 of FIG. 11 in which the red, green, and blue SELEDs are offset relative to one another. The integrated array 1600 includes red, blue, and green SELEDs formed on a single substrate 1602. The SELEDs include a common cathode contact 1604 and each SELED also includes an anode contact 1606 and an emission aperture 1608, as shown for one SELED in the figure. With the integrated array 1600, the emission apertures 1608 of the individual SELEDs may be formed very close together, which is desirable to provide uniform scanning of zones Z1-Z10 (FIG. 4) as previously discussed. The emission apertures 1608 are offset in the embodiment of FIG. 16, but they could also be aligned to form an integrated array corresponding to the array 404 of FIG. 10 according to another embodiment of the present invention.

Various combinations of the embodiments of the SELEDs of FIGS. 12-16 can be utilized in forming the embodiments of the array 404 shown in FIGS. 10 and 11. As previously described, all SELEDs in the array 404 could be formed from individual SELED chips 1300 and 1400 arranged as desired to obtain the desired array structure. Alternatively, some of the SELEDs in the array 404 may be formed from one or more N×1 subarrays 1500 of FIG. 15. For example, in one embodiment the array 404 is formed form two 10×1 subarrays 1500 of green SELEDs 1502*a-j* in combination with individual chips 1300 and 1400 for the red and blue SELEDs. In another embodiment, each of the red, blue, and green SELEDs could be formed as N×1 subarrays 1500, with these subarrays then being positioned adjacent one another to form the array 404. In a further embodiment, the array 404 could be formed from N×1 subarrays 1500 of green SELEDs in combination with red-blue subarrays on which the red and blue SELEDs are alternately formed. These individual green and red-blue subarrays 1500 are then assembled to form the array 404. Individual N×1 red subarrays 1500 and individual N×1 blue subarrays could also be formed, each with alternately spaced red and blue SELEDs. These subarrays could then be combined with N×1 green subarrays 1500 to form the array 404. In yet another embodiment, individual groups G1-G10 of red, blue, green SELEDs could be formed as individual chips, and these chips then assembled to form the array 404. Other combinations of the individual SELED chips 1300, 1400 and the subarrays 1500 are possible and are within the scope of the present invention.

Figure 17:
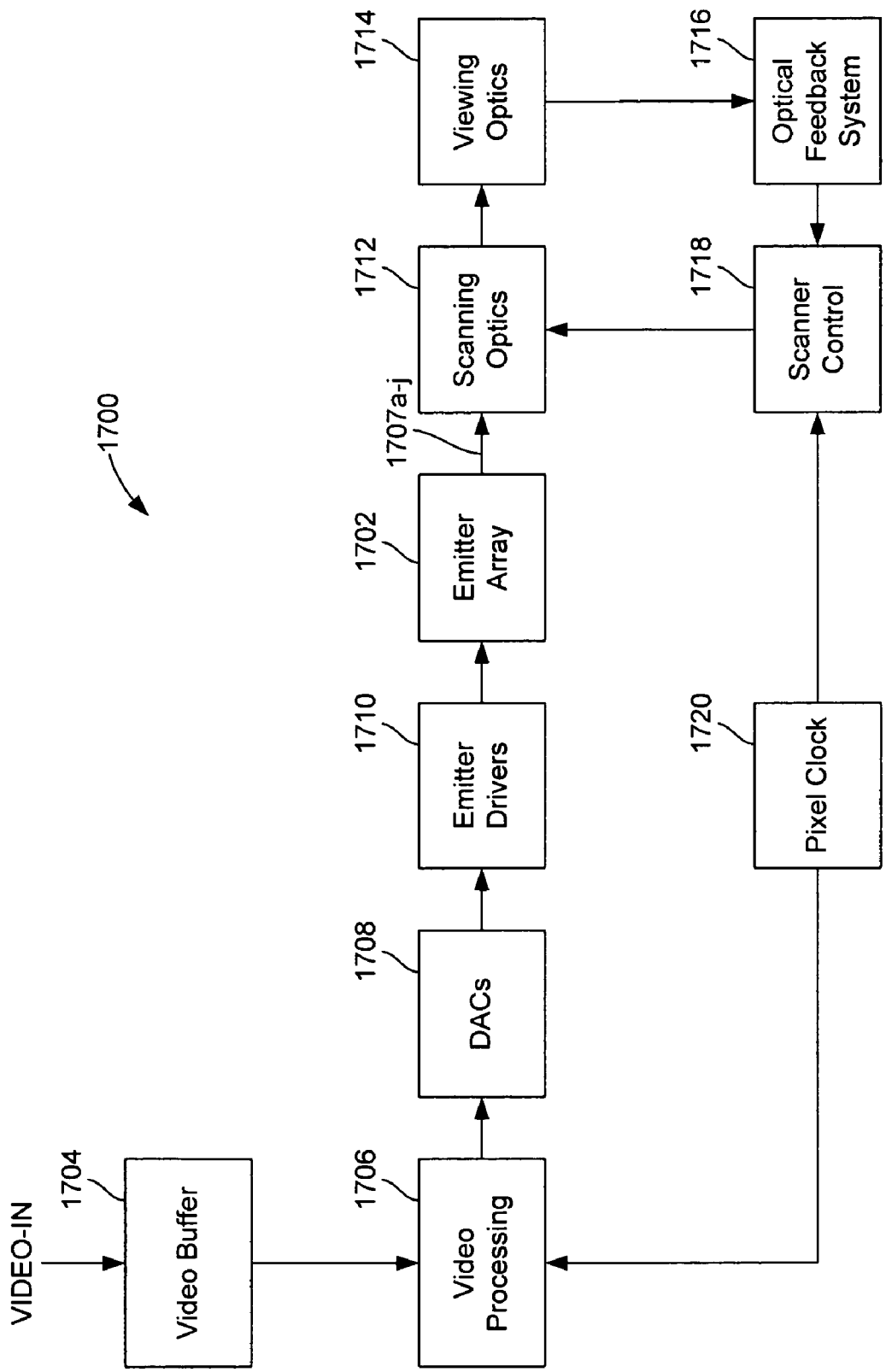
FIG. 17 is a functional block diagram of an image-display system including an illuminator array according to one embodiment of the present invention.

FIG. 17 is a functional block diagram of an image-display system 1700 including an emitter array 1702 according to one embodiment of the present invention. The emitter array 1702 may correspond to the array 404 of FIG. 10 or 11, which, in turn, may be formed from any appropriate light sources including the previously described combinations of the individual SELED chips and subarrays of FIGS. 12-16. The image-display system 1700 includes a video buffer 1704 that receives and stores video input data VIDEO-IN to be displayed. The buffer 1704 provides the VIDEO-IN data to video processing circuitry 1706, which processes the video data to prepare the data for display. The video processing circuitry 1706 processes the VIDEO-IN data to separate the data into parallel data streams that will drive corresponding groups of emitters in the array 1702. For example, when the array 1702 corresponds to the array 404 of FIG. 10 or 11 the video processing circuitry 1706 separates the VIDEO-IN data into 40 parallel data streams. The 40 parallel data streams correspond to two green, one red, and one blue data stream for each group G1-G10 of emitters in the array 1702 (four data streams per group times ten groups). The groups G1-G10 of emitters in the emitter array 1702 generate corresponding image beams 1707*a-j* that correspond to the image beams 406*a-j* for the embodiments of the emitter array 404 in FIGS. 10 and 11.

The video processing circuitry 1706 further processes the VIDEO-IN data to interpolate the video data according to an interpolation trajectory specified as a series of segments approximating a current position for each of the image beams being generated by the emitter array 1702, as will be described in more detail below. Briefly, the VIDEO-IN data is typically in the form of an array or grid pattern of video data corresponding to rows and columns of pixels. This is true because most source images corresponding to the VIDEO-IN data contain data for pixels arranged in a grid pattern, such as source images that are computer generated or that are captured by a conventional video camera or digital camera. The trajectory of the image beams generated by the emitter array 1702 do not necessarily scan a perfect grid pattern and thus the intensities for the two green, one red, and one blue image beams generating the individual pixels for the image being displayed are interpolated from the data of adjacent pixels in the grid pattern of the VIDEO-IN data. The video processing circuitry 1706 further processes the VIDEO-IN data to provide degamma conversion of the data prior to interpolating the data and to thereafter provide gamma conversion of the interpolated data, as will also be explained in more detail below. "Degamma conversion", "gamma correction" or simply "gamma" in this context refers to a correction that is performed on data to be displayed to correct for nonlinear operation of the emitters in the array 1702, as will be appreciated by those skilled in the art.

A plurality of digital-to-analog converters 1708 receive the respective processed data streams from the video processing circuitry 1706 in the form of a digital words for each pixel being generated by each image beam in the emitter array 1702. In response to the applied digital words, the digital-to-analog converters 1708 develop corresponding analog signals that are applied to drive emitter drivers 1710. Each emitter driver 1710 develops a signal to drive a corresponding emitter in the array 1702. In response to the signals from the emitter drivers 1710, each emitter in the array 1702 generates a corresponding image beam with the array collectively generating the image beams 1707*a-j*. The image beams 1707*a-j* propagate through scanning optics 1712 that include a reflector (not shown) that horizontally and vertically scan the image beams on viewing optics 1714, which may include a person's pupil or a suitable viewing screen, for example.

The scanning optics 1714 or the viewing optics 1714 may further include components for providing feedback signals to the scanner control 1718 indicating the position of the image beams 1707*a-j*. The optional optical feedback subsystem 1716 generates correction signals in response to the feedback signals from the viewing optics 1714, and these correction signals are applied to a scanner control subsystem 1718. The scanner control subsystem 1718 generates signals to control the scanning optics 1712 in response to a pixel clock signal from a pixel clock generator 1720, and adjusts the generates signals in response to the correction signals from the optical feedback subsystem 1716. The pixel clock generator 1720 also supplies the pixel clock signal to clock the video processing circuitry 1706, with the pixel clock signal indicating the current pixel being generated or to be generated in the viewing optics 1714.

Figure 18:
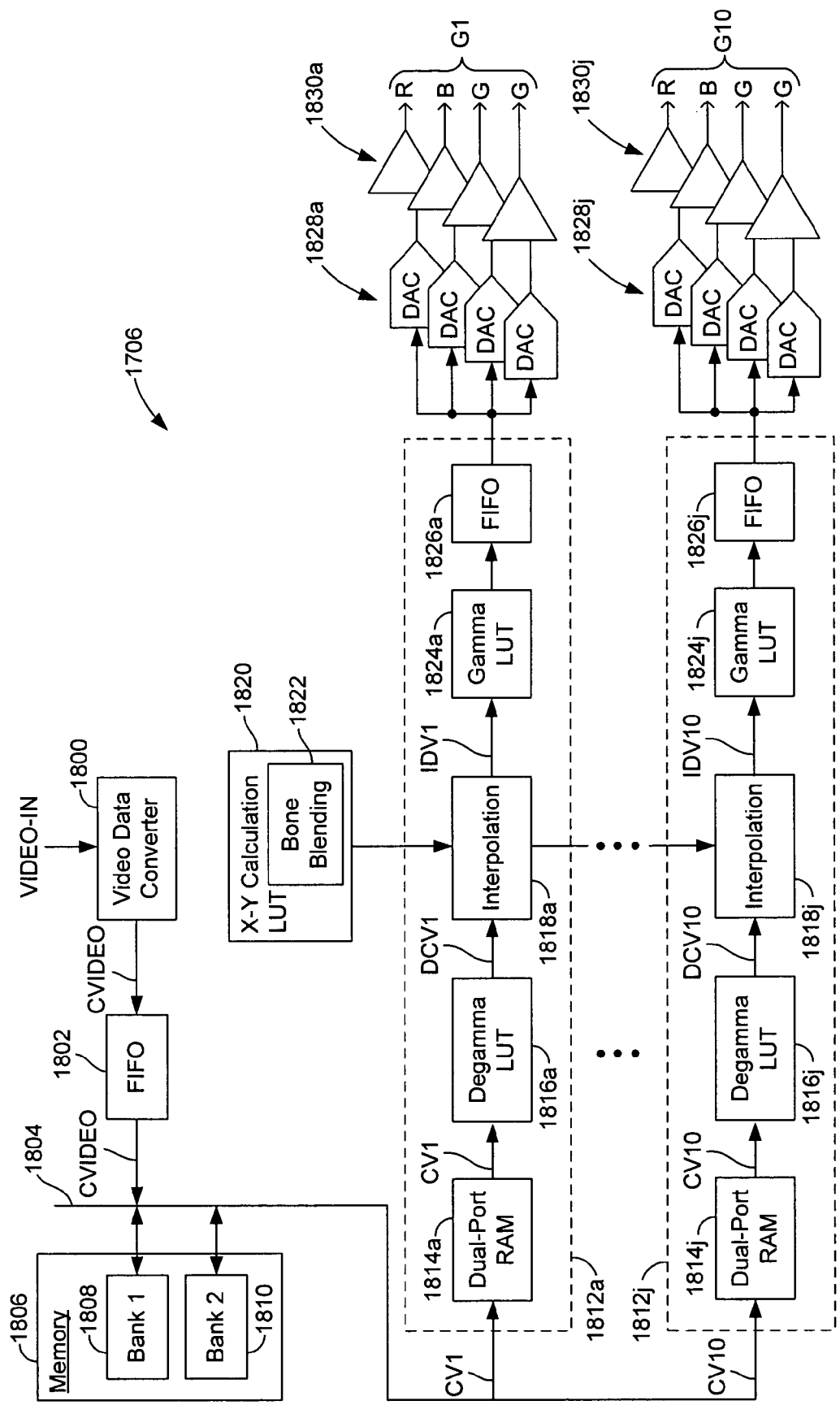
FIG. 18 is a functional block diagram of the video processing circuitry of FIG. 17 according to one embodiment of the present invention.

FIG. 18 is a functional block diagram of the video processing circuitry 1706 of FIG. 17 according to one embodiment of the present invention. The video processing circuitry 1706 includes a video data converter 1800 that receives input video data VIDEO-IN to be displayed and converts the video data from a first format to a second format. In one embodiment, the converter 1800 converts VIDEO-IN data in the YCrCb (Luma or brightness, Chroma Red, Chroma Blue) color space or format into corresponding RGB data that is designated CVIDEO. A first-in-first-out buffer (FIFO) 1802 receives the CVIDEO data from the converter 1800 and supplies the data on a first in, first out basis over a data bus 1804 to a memory 1806. The memory 1806 includes two memory-cell banks 1808, 1810 that store the CVIDEO data, and which allow CVIDEO data from the FIFO buffer 1802 to be written into a first one of the banks while CVIDEO data is read out of the other bank.

Segments of the CVIDEO data stored the banks 1808, 1810 of the memory 1806 are transferred over the data bus 1804 to a number of video channels 1812*a-j*. These segments of video data are designated CV1-CV10 and each segment is transferred to a corresponding video channel 1812*a-j*. Each video channel 1812*a-j* includes circuitry for processing the received segment of data CV1-CV10 and driving a corresponding group G1-G10 of emitters, as will be described in more detail below. Recall, each group G1-G10 of emitters illuminates a corresponding zone Z1-Z10 of a screen 410 as discussed with reference to FIG. 4, and each segment of data CV1-CV10 corresponds to the video data to be displayed in a corresponding one of these zones. Each segment of data CV1-CV10 is transferred from the memory 1806 over the data bus 1804 and stored in a dual-port memory 1814*a-j* in the corresponding video channel 1812*a-j*. Each dual-port memory 1814*a-j* receives and stores the corresponding segment of data CV1-CV10 and outputs the stored data to a corresponding degamma look-up table circuit 1816*a-j*. Each dual-port memory 1814*a* can receive and store new segment data CV1-CV10 while providing the currently stored data to the corresponding degamma look-up table circuit 1816*a-j*.

Each degamma look-up table circuit 1816*a-j* applies a look-up table to the segment of data CV1-CV10 to remove gamma correction factors from the data and thereby generate degamma video data DCV1-DCV10. The input video data VIDEO-IN and thus each of the segments of data CV1-CV10 includes gamma correction factors that must be removed prior to interpolating the data for display in the system 1700. Each segment of degamma video data DCV1-DCV10 is applied to a corresponding interpolation circuit 1818*a-j* that interpolates this data to generate interpolated video data IVD. Recall, the VIDEO-IN data and thus the segments of data CV1-CV10 are in the form of an array or grid pattern of video data corresponding to rows and columns of pixels while the trajectory of the image beams generated by each of the groups G1-G10 of SELEDs do not scan a perfect grid pattern. Accordingly, the interpolation circuit 1818*a-j* interpolates the intensities for the two green, one red, and one blue image beams generating the individual pixels for the image being displayed from the data of adjacent pixels in the grid pattern of the CV1-CV10 data.

An X-Y calculation look-up table circuit 1820 determines the location of the image beams for each of the groups G1-G10 of SELEDs and supplies this location in terms of X and Y coordinates to each of the interpolation circuits 1818*a-j*. The X coordinates give the horizontal position of the image beams while the Y coordinate gives the vertical position of each image beam in the corresponding zone Z1-Z10. Each interpolation circuit 1818a-j utilizes these X and Y coordinates to determine the pixels in the CV1-CV10 data that are proximate the position of the image beam, and determines from the values of these proximate pixels an interpolated pixel value. The interpolation circuits 1818a-j outputs these interpolated pixel values collectively as interpolated video data IVD1-IVD10. A variety of different interpolation algorithms may be applied to the CV1-CV10 data, and in one embodiment each interpolation circuit 1818a-j applies a bilinear interpolation algorithm. A bilinear interpolation algorithm applied to a grid patterns of source video data is described in more detail in previously incorporated U.S. patent application Ser. No. 10/441,916 to Brown et al., entitled "APPARATUS AND METHOD FOR BI-DIRECTIONALLY SWEEPING AN IMAGE BEAM IN THE VERTICAL DIMENSION AND RELATED APPARATI AND METHODS."

The X-Y calculation look-up table circuit 1820 also includes zone blending logic 1822 that applies the zone blending algorithm previously described with reference to FIGS. 8 and 9. The zone blending logic 1822 generates the blending coefficient $B_{coe}$ from the vertical position Y of the image beams within each zone Z1-Z10, and the interpolation circuits 1818a-j multiply the determined interpolated intensity for each pixel by this coefficient to generate the interpolated video data IVD1-IVD10. The interpolation algorithm applied by the interpolation circuits 1818a-j will be described in more detail below.

The interpolated video data IVD1-IVD10 is output to corresponding gamma look-up table circuits 1824a-j, each of which applies a look-up table to add a gamma correction factor to the interpolated video data and thereby generate gamma corrected interpolate video data GIVD1-GIVD10. In each video channel 1812a-j, a FIFO buffer 1826a-j stores the corresponding GIVD1-GIV10 data and outputs this data to a group of four digital-to-analog converters 1828a-j. Each group of digital-to-analog converters 1828a-j converts the received digital GIVID1-GIVD10 data into corresponding analog signals. A group of drivers 1830a-j receives the analog signals from each group of digital-to-analog converters and in response to these signals the drivers generate signals to drive the emitters in the corresponding group of emitters in the array 1702 (FIG. 17). Since each group G1-G10 of emitters includes, according to one embodiment, two green, one red, and one blue emitter, each group of drivers 1830a-j generates four corresponding drive signals which are designated G for signals driving green emitter, R for signals driving a red emitter, and B for a signal driving a blue emitter. The groups of digital-to-analog converters 1828a-j correspond to the digital-to-analog converters 1708 of FIG. 17 and the groups of drivers 1830a-j correspond to the drivers 1710 of FIG. 17.

Figure 19:
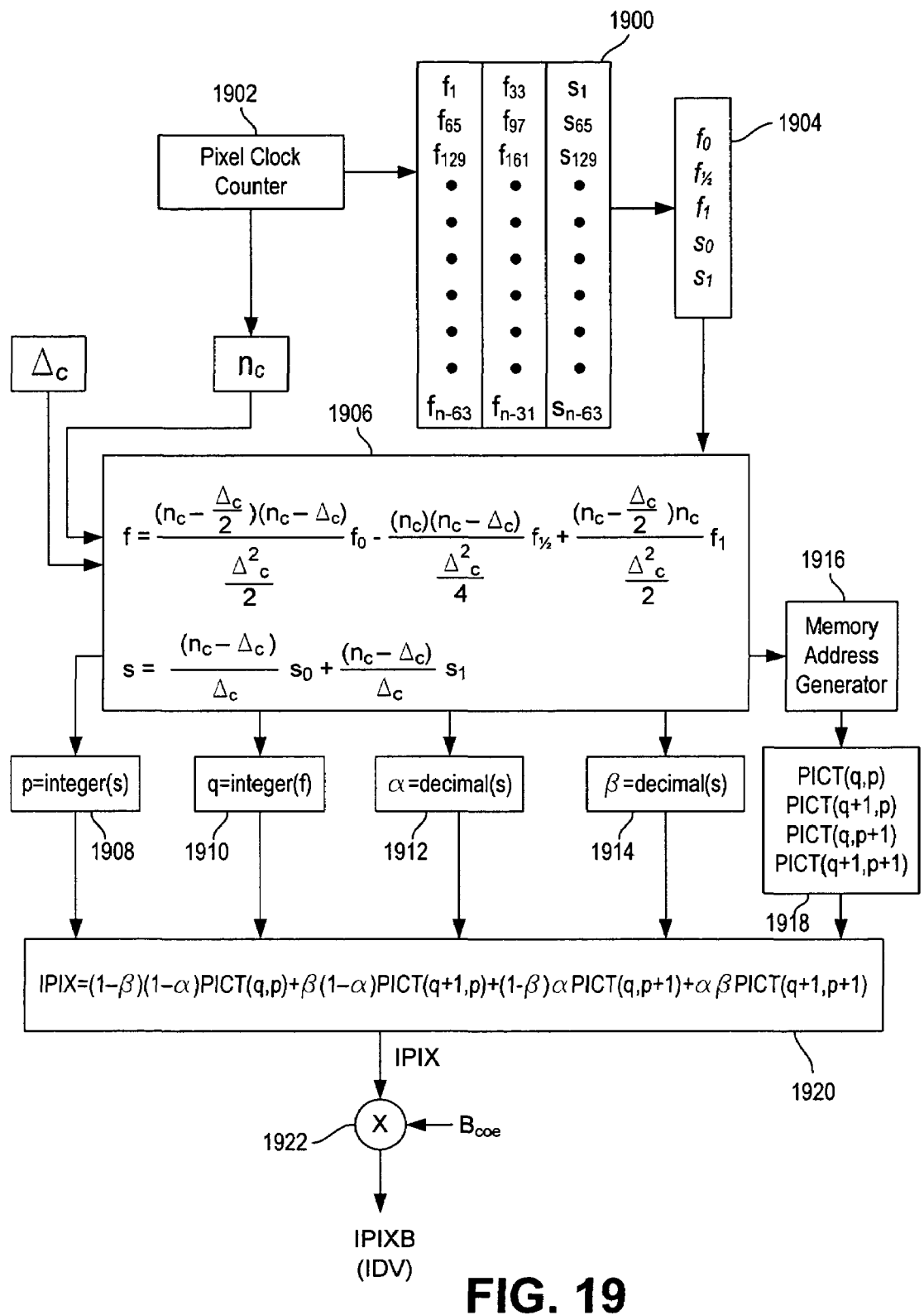
FIG. 19 is a functional flow diagram illustrating the interpolation process executed by the interpolation circuits of FIG. 18 according to one embodiment of the present invention.

The interpolation process executed by the interpolation circuits 1818a-j of FIG. 18 according to one embodiment of the present invention will now be described in more detail with reference to the functional flow diagram of FIG. 19. The interpolation process utilizes a look-up table (LUT) 1900 that contains a plurality of vertical and horizontal positions of the image beam as the image scans a respective zone Z1-Z10 (FIG. 4). The values in the LUT 1900 are empirically determined and give the actual position of the image beam at a plurality of horizontal and vertical locations as the beam scans the zone Z1-Z10. In the embodiment of FIG. 19, the value of the image beam was measured every 32 cycles of a pixel clock counter 1902 in the horizontal X direction and every 64 cycles in the vertical Y direction. The horizontal X direction is designated the fast (f) direction since the reflector 408 scans the image beam must faster in the horizontal direction than in the vertical direction. Conversely, the vertical Y direction is designated the slow (s) direction since the reflector 408 scans the beam slower in the vertical direction than the horizontal direction. The pixel clock counter 1902 generates a pixel clock count $n_c$ and is reset when the pixel clock count equals a pixel clock counter period $\Delta_c$. In the embodiment of FIG. 19, the pixel clock counter period $\Delta_c$ equals 64.

In operation, three values f for the fast position of the image beam designated $f_0$, $f_{1/2}$, and $f_1$ are pulled from the LUT 1900 every time the pixel clock counter $n_c$ equals 64 and is reset. Similarly, two values for the slow position of the image beam designated $s_0$, $s_1$ are pulled from the LUT 1900 every time the pixel clock counter $n_c$ is reset. The values $f_0$, $f_{1/2}$, $f_1$, $s_0$, and $s_1$ pulled from the LUT 1900 are shown in a box 1904. Thus, initially the interpolation process pulls the values $f_1$, $f_{33}$, $f_{64}$, $s_1$, and $s_{65}$ from the LUT 1900. The values $f_1$, $f_{33}$, $f_{64}$ indicate the position of the image beam at 0, 32, and 64 cycles of the pixel clock count $n_c$ and correspond to the values $f_0$, $f_{1/2}$, and $f_1$, respectively. Similarly, the values $s_1$, and $s_{65}$ indicate the position of the image beam during the current period $\Delta_c$ of the pixel clock counter 1902 and during the next period of the pixel clock counter, respectively.

Once the current values for $f_0$, $f_{1/2}$, $f_1$, $s_0$, and $s_1$ have been retrieved from the LUT 1900, these values along with values of the pixel clock counter period $\Delta_c$ and the pixel clock count $n_c$ are utilized to determine an interpolated position for the fast f and slow s position of the image beam as shown in a box 1906. These equations give an interpolated value f indicating the current position of the image beam in the fast or horizontal direction and an interpolated value s indicating the current position of the image beam in the slow or vertical direction. Once the values of f and s have been calculated in box 1906, four values designated p, q, α, and β are calculated from these values as indicated in boxes 1908-1914, respectively. The value p is given by the integer portion of the value s and the value q by the integer portion of the value f. The value α is given by the decimal portion of the value s and the value β by the decimal portion of the value s.

The values p and q are utilized in determining which four pixels nearest the current position of the image beam, as given by f and s, are to be utilized in generating an interpolated value for the pixel corresponding to the current position of the image beam. Accordingly, a memory address generator 1916 utilizes the values of p and q to access the four pixels in the source image being displayed that are closest to the current position of the image beam as given by f and s. These four pixels are designated PICT(q,p), PICT(q+1,p), PICT(q,p+1), and PICT(q+1,p+1) as shown in box 1918.

A bilinear interpolation algorithm shown in box 1920 utilizes the values of these four pixels PICT(q,p), PICT(q+1,p), PICT(q,p+1), and PICT(q+1,p+1) along with the values p, q, α and β determined in boxes 1908-1914 to determine an interpolated value IPIX for the intensity of the pixel corresponding to the current position of the image beam as given by f and s. A multiplier 1922 thereafter multiplies the IPIX value by the current value of the blending coefficient $B_{coe}$ to yield an interpolated and blended pixel value IPIXB that is thereafter applied to the corresponding gamma LUT 1824 in FIG. 18. Although the functional flow diagram of FIG. 19 is described as the interpolation process executed by the interpolation circuits 1818a-j of FIG. 18, the diagram also includes functionality performed by the X-Y calculation LUT circuit 1820 and zone blending logic 1822 in FIG. 18.

One skilled in the art will understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. It should also be noted that the functions performed by various components in the embodiments of FIGS. 4, 17, and 18 may be divided and performed by more elements or combined and be performed by fewer elements depending upon the actual implementation of the components in the systems 400, 1700, and 1800. Therefore, the present invention is to be limited only by the appended claims.

U.S. patent application Ser. No. 10/768,199 to Wine et al. filed on Jan, 30, 2004 and entitled METHOD AND APPARATUS FOR BLENDING REGIONS SCANNED BY A BEAM SCANNER discloses a system and method dealing with blending respective regions scanned by a scanning beam, and is incorporated herein by reference.

What is claimed is:

1. A scan assembly operable to generate a plurality of image beams and operable to scan the image beams in a plurality of overlapping display zones, wherein the scan assembly is operable to scan each of the image beams in a vertical direction and a horizontal direction, and wherein the scan assembly modulates an intensity of each of the image beams as a function of a vertical position of each image beam within the corresponding display zone.

2. The scan assembly of claim 1 wherein each image beam scans a corresponding display zone and adjacent display zones overlap to define blending zones, and wherein the scan assembly modulates an intensity of each image beam as a function of a position of the image beam within a corresponding blending zone.

3. The scan assembly of claim 2 wherein two image beams scan each blending zone, and wherein within each blending zone an intensity of a first corresponding image beam and an intensity of a second corresponding image beam are adjusted according to a blending algorithm.

4. The scan assembly of claim 3 wherein for each blending zone the blending algorithm linearly increases the intensity of the first corresponding image beam and linearly decreases the intensity of the second corresponding image beam.

5. The scan assembly of claim 1 wherein the scan assembly scans each of the image beams sinusoidally and bi-directionally in the horizontal direction and bi-directionally and approximately linearly in the vertical direction.

6. The scan assembly of claim 1 wherein the scan assembly scans each of the image beams sinusoidally and bi-directionally in both the horizontal and vertical directions.

7. A scan assembly including an emitter array containing a plurality of optical emitters, each optical emitter operable to generate a corresponding image beam and the scan assembly operable to scan the image beams in a plurality of overlapping display zones that collectively form a field of view, wherein each image beam scans a corresponding display zone in the field of view and adjacent display zones overlap to define blending zones, and wherein the scan assembly modulates an intensity of each image beam as a function of a position of the image beam within a corresponding blending zone.

8. The scan assembly of claim 7 wherein within a given blending zone an intensity of a first corresponding image beam is linearly increased while an intensity of a second corresponding image beam is linearly decreased.

9. The scan assembly of claim 7 wherein each optical emitter in the emitter array comprises a group of light emitting diodes.

10. The scan assembly of claim 9 wherein each group of light emitting diodes comprises two green SELEDs, one red SELED, and one blue SELED.

11. The scan assembly of claim 7 wherein the scan assembly is operable to scan each of the image beams in a vertical direction and a horizontal direction.

12. The scan assembly of claim 7 wherein the field of view corresponds to a screen onto which the scan assembly scans the image beams.

13. A scan assembly operable to generate a plurality of image beams and operable to scan each image beam through a corresponding display zone and at least one corresponding blending zone, and the scan assembly further operable to adjust an intensity of each image beam as a function of a position of the image beam in each corresponding blending zone, wherein two image beams scan each blending zone, and wherein within each blending zone an intensity of a first corresponding image beam and an intensity of a second corresponding image beam are adjusted according to a blending algorithm.

14. The scan assembly of claim 13 wherein the scan assembly adjusts the intensities of all the image beams within their corresponding blending zones in the same way.

15. The scan assembly of claim 13 wherein for each blending zone the blending algorithm a linearly increases the intensity of the first corresponding image beam and linearly decreases the intensity of the second corresponding image beam.

16. The scan assembly of claim 15 wherein the intensity for each image beam is given by an initial intensity multiplied by a blending coefficient $B_{coe}$ that is defined by the following equations:

$$B_{coe} = \begin{cases} 0 & \text{for } Z_L - \frac{BZ}{2} > Y \text{ or } Y > Z_H + \frac{BZ}{2} \\ \frac{1}{2} - \frac{Z_L - Y}{BZ} & \text{for } Z_L - \frac{BZ}{2} < Y \leq Z_L + \frac{BZ}{2} \\ 1 & \text{for } Z_L + \frac{BZ}{2} < Y \leq Z_H - \frac{BZ}{2} \\ \frac{1}{2} - \frac{Y - Z_H}{BZ} & \text{for } Z_H - \frac{BZ}{2} < Y \leq Z_H + \frac{BZ}{2} \end{cases}$$

wherein BZ is a vertical height of each blending zone, $Z_L$ is a zone low point of the corresponding display zone, $Z_H$ is a zone high point of the display zone, and Y indicates a vertical position of the image beam within the display zone.

17. The scan assembly of claim 15 wherein the scan assembly is operable to scan each of the image beams in a vertical direction and a horizontal direction.

18. An image generator, comprising:
a beam generator operable to generate a plurality of image beams, wherein the beam generator comprises a plurality of groups of optical emitters, each group operable to generate a corresponding image beam; and
a scan assembly operable to scan the image beams in a plurality of overlapping display zones, wherein the scan assembly scans each image beam through a corresponding display zone, with adjacent display zones overlapping to define blending zones, and wherein the scan assembly provides an indication of a position of each image beam within a corresponding blending zone and the beam generator modulates an intensity of each image beam as a function of the position of the image beam within the blending zone.

19. The image generator of claim 18 wherein each group of optical emitters comprises a plurality of light emitting diodes, each light emitting diode operable to generate an individual beam and the individual beams from the light emitting diodes in the group collectively corresponding to the image beam for the group.

20. The image generator of claim 19 wherein the light emitting diodes in each group comprise two green SELEDs, one red SELED, and one blue SELED.

21. The image generator of claim 18 wherein two image beams scan each blending zone, and wherein within each blending zone an intensity of a first corresponding image beam and an intensity of a second corresponding image beam are adjusted according to a blending algorithm.

22. The image generator of claim 21 wherein for each blending zone the blending algorithm linearly increases the intensity of the first corresponding image beam and linearly decreases the intensity of the second corresponding image beam.

23. The image generator of claim 18 wherein the scan assembly is operable to scan each of the image beams in a vertical direction and a horizontal direction and the scan assembly provides an indication of a vertical position of each image beam, and wherein the beam generator modulates an intensity of each of the image beams as a function of the vertical position of each image beam within the corresponding display zone.

24. An image-display system, comprising:
a display screen; and
an image generator, including,
a beam generator operable to generate a plurality of image beams; and
a scan assembly operable to scan the image beams in a plurality of overlapping display zones on the display screen, wherein the scan assembly scans each image beam through a corresponding display zone, with adjacent display zones overlapping to define blending zones, and wherein the scan assembly provides an indication of a position of each image beam within a corresponding blending zone and the beam generator modulates an intensity of each image beam as a function of the position of the image beam within the blending zone.

25. The image-display system of claim 24 wherein the beam generator comprises a plurality of groups of optical emitters, each group operable to generate a corresponding image beam.

26. The image-display system of claim 25 wherein each group of optical emitter comprises a plurality of laser diodes, each laser diode operable to generate an individual beam and the individual beams from the laser diodes in the group collectively corresponding to the image beam for the group.

27. The image-display system of claim 24 wherein each group of optical emitters comprises a plurality of light emitting diodes, each light emitting diode operable to generate an individual beam and the individual beams from the light emitting diodes in the group collectively corresponding to the image beam for the group.

28. The image-display system of claim 27 wherein the light emitting diodes in each group comprise two green SELEDs, one red SELED, and one blue SELED.

29. A method of scanning image beams, comprising:
generating a plurality of image beams;
scanning each image beam through a corresponding display zone;
scanning each image beam through a blending zone, wherein scanning each image beam through a blending zone comprises scanning first and second image beams through the corresponding blending zone, and wherein adjusting an intensity of each image beam as a function of a position of the image beam in the blending zone comprises adjusting the intensities of the first and second image beams according to a blending algorithm; and
adjusting an intensity of each image beam as a function of a position of the image beam in the blending zone.

30. The method of claim 29 wherein the blending algorithm for at least one blending zone linearly increases the intensity of the first corresponding image beam and linearly decreases the intensity of the second corresponding image beam as a function of a vertical position of the image beam within the blending zone.

31. The method of claim 29 wherein the operations of scanning comprise scanning each image beam sinusoidally and bi-directionally in a horizontal direction and bi-directionally and approximately linearly in a vertical direction.

32. The method of claim 29 wherein the operations of scanning comprise scanning each image beam sinusoidally and bi-directionally in both a horizontal and a vertical direction.

33. A method of scanning image beams, comprising:
generating a plurality of image beams; and
scanning the image beams in a plurality of overlapping display zones that collectively form a field of view, wherein overlapping portions of adjacent display zones form blending zones, and wherein the operation of scanning further comprises modulating an intensity of each image beam in a corresponding blending zone as a function of a position of the image beam within the blending zone.

34. The method of claim 33 wherein within a given blending zone the intensity of a first corresponding image beam is linearly increased while the intensity of a second corresponding image beam is linearly decreased.

35. The method of claim 34 wherein the operation of scanning comprises scanning each of the image beams in a vertical direction and a horizontal direction.

* * * * *